(12) United States Patent
Verghese et al.

(10) Patent No.: US 10,424,976 B2
(45) Date of Patent: Sep. 24, 2019

(54) RECONFIGURABLE CONTROL ARCHITECTURES AND ALGORITHMS FOR ELECTRIC VEHICLE WIRELESS ENERGY TRANSFER SYSTEMS

(71) Applicant: WiTricity Corporation, Watertown, MA (US)

(72) Inventors: Simon Verghese, Arlington, MA (US); Morris P. Kesler, Bedford, MA (US); Katherine L. Hall, Arlington, MA (US); Herbert Toby Lou, Carlisle, MA (US); Ron Fiorello, Tewksbury, MA (US)

(73) Assignee: WiTricity Corporation, Watertown, MA (US)

( * ) Notice: Subject to any disclaimer, the term of this patent is extended or adjusted under 35 U.S.C. 154(b) by 260 days.

(21) Appl. No.: 15/355,143

(22) Filed: Nov. 18, 2016

(65) Prior Publication Data

US 2017/0066335 A1    Mar. 9, 2017

Related U.S. Application Data

(63) Continuation of application No. 13/612,494, filed on Sep. 12, 2012, now abandoned.
(Continued)

(51) Int. Cl.
*B60L 3/00*  (2019.01)
*B60L 53/12* (2019.01)
(Continued)

(52) U.S. Cl.
CPC .............. *H02J 50/90* (2016.02); *B60L 3/00* (2013.01); *B60L 53/12* (2019.02); *B60L 53/60* (2019.02);
(Continued)

(58) Field of Classification Search
CPC .. H02J 50/12; H02J 50/30; H02J 50/50; H02J 50/80; H02J 50/90; H02J 7/0004;
(Continued)

(56) References Cited

U.S. PATENT DOCUMENTS 645,576 A    3/1900 Tesla
649,621 A    5/1900 Tesla
(Continued)

FOREIGN PATENT DOCUMENTS

CA        142352      8/1912
CN      102239633   11/2011
(Continued)

OTHER PUBLICATIONS

"Intel CTO Says Gap between Humans, Machines Will Close by 2050", *Intel News Release*, (See intel.com/.../20080821comp.htm?iid=S . . . ) (Printed Nov. 6, 2009).
(Continued)

*Primary Examiner* — Fritz M Fleming
*Assistant Examiner* — Jagdeep S Dhillon
(74) *Attorney, Agent, or Firm* — Fish & Richardson P.C.

(57) ABSTRACT

A control architecture for electric vehicle wireless power transmission systems that may be segmented so that certain essential and/or standardized control circuits, programs, algorithms, and the like, are permanent to the system and so that other non-essential and/or augmentable control circuits, programs, algorithms, and the like, may be reconfigurable and/or customizable by a user of the system. The control architecture may be distributed to various components of the wireless power system so that a combination of local or low-level controls operating at relatively high-speed can protect critical functionality of the system while higher-level and relatively lower speed control loops can be used to control other local and system-wide functionality.

22 Claims, 16 Drawing Sheets

Related U.S. Application Data

(60) Provisional application No. 61/566,450, filed on Dec. 2, 2011, provisional application No. 61/533,281, filed on Sep. 12, 2011.

(51) Int. Cl.
    *H02J 50/80* (2016.01)
    *H02J 7/02* (2016.01)
    *H02J 50/12* (2016.01)
    *H02J 50/90* (2016.01)
    *H02J 5/00* (2016.01)
    *B60L 53/60* (2019.01)
    *H02J 7/00* (2006.01)

(52) U.S. Cl.
    CPC .............. *H02J 5/005* (2013.01); *H02J 7/025* (2013.01); *H02J 50/12* (2016.02); *H02J 50/80* (2016.02); *H02J 2007/0096* (2013.01); *Y02T 10/7005* (2013.01); *Y02T 10/7072* (2013.01); *Y02T 90/121* (2013.01); *Y02T 90/122* (2013.01); *Y02T 90/128* (2013.01); *Y02T 90/14* (2013.01); *Y02T 90/163* (2013.01)

(58) Field of Classification Search
    CPC ........ H02J 7/0008; H02J 7/0068; H02J 9/061; Y02T 10/7005; Y02T 10/7044; Y02T 10/7061; Y02T 10/7072; Y02T 90/121; Y02T 90/128; G06F 1/26; G06F 1/263
    USPC ......................................... 307/104, 9.1, 10.1
    See application file for complete search history.

(56) References Cited

U.S. PATENT DOCUMENTS

| | | | |
|---|---|---|---|
| 787,412 A | 4/1905 | Tesla | |
| 1,119,732 A | 12/1914 | Tesla | |
| 2,133,494 A | 10/1938 | Waters | |
| 3,517,350 A | 6/1970 | Beaver | |
| 3,535,543 A | 10/1970 | Dailey | |
| 3,780,425 A | 12/1973 | Penn et al. | |
| 3,871,176 A | 3/1975 | Schukei | |
| 4,088,999 A | 5/1978 | Fletcher et al. | |
| 4,095,998 A | 6/1978 | Hanson | |
| 4,180,795 A | 12/1979 | Matsuda et al. | |
| 4,280,129 A | 7/1981 | Wells | |
| 4,450,431 A | 5/1984 | Hochstein | |
| 4,588,978 A | 5/1986 | Allen | |
| 5,027,709 A | 7/1991 | Slagle | |
| 5,033,295 A | 7/1991 | Schmid et al. | |
| 5,034,658 A | 7/1991 | Hiering et al. | |
| 5,053,774 A | 10/1991 | Schuermann et al. | |
| 5,070,293 A | 12/1991 | Ishii et al. | |
| 5,118,997 A | 6/1992 | El-Hamamsy | |
| 5,216,402 A | 6/1993 | Carosa | |
| 5,229,652 A | 7/1993 | Hough | |
| 5,287,112 A | 2/1994 | Schuermann | |
| 5,341,083 A | 8/1994 | Klontz et al. | |
| 5,367,242 A | 11/1994 | Hulman | |
| 5,374,930 A | 12/1994 | Schuermann | |
| 5,408,209 A | 4/1995 | Tanzer et al. | |
| 5,437,057 A | 7/1995 | Richley et al. | |
| 5,455,467 A | 10/1995 | Young et al. | |
| 5,493,691 A | 2/1996 | Barrett | |
| 5,522,856 A | 6/1996 | Reineman | |
| 5,528,113 A | 6/1996 | Boys et al. | |
| 5,541,604 A | 7/1996 | Meier | |
| 5,550,452 A | 8/1996 | Shirai et al. | |
| 5,565,763 A | 10/1996 | Arrendale et al. | |
| 5,594,318 A | 1/1997 | Nor et al. | |
| 5,630,835 A | 5/1997 | Brownlee | |
| 5,697,956 A | 12/1997 | Bornzin | |
| 5,703,461 A | 12/1997 | Minoshima et al. | |
| 5,703,573 A | 12/1997 | Fujimoto et al. | |
| 5,710,413 A | 1/1998 | King et al. | |
| 5,742,471 A | 4/1998 | Barbee, Jr. et al. | |
| 5,821,728 A | 10/1998 | Sshwind | |
| 5,821,731 A | 10/1998 | Kuki et al. | |
| 5,864,323 A | 1/1999 | Berthon | |
| 5,898,579 A | 4/1999 | Boys et al. | |
| 5,903,134 A | 5/1999 | Takeuchi | |
| 5,923,544 A | 7/1999 | Urano | |
| 5,940,509 A | 8/1999 | Jovanovich et al. | |
| 5,957,956 A | 9/1999 | Kroll et al. | |
| 5,959,245 A | 9/1999 | Moe et al. | |
| 5,986,895 A | 11/1999 | Stewart et al. | |
| 5,993,996 A | 11/1999 | Firsich | |
| 5,999,308 A | 12/1999 | Nelson et al. | |
| 6,012,659 A | 1/2000 | Nakazawa et al. | |
| 6,047,214 A | 4/2000 | Mueller et al. | |
| 6,066,163 A | 5/2000 | John | |
| 6,067,473 A | 5/2000 | Greeninger et al. | |
| 6,108,579 A | 8/2000 | Snell et al. | |
| 6,127,799 A | 10/2000 | Krishnan | |
| 6,176,433 B1 | 1/2001 | Uesaka et al. | |
| 6,184,651 B1 | 2/2001 | Fernandez et al. | |
| 6,207,887 B1 | 3/2001 | Bass et al. | |
| 6,232,841 B1 | 5/2001 | Bartlett et al. | |
| 6,238,387 B1 | 5/2001 | Miller, III | |
| 6,252,762 B1 | 6/2001 | Amatucci | |
| 6,436,299 B1 | 8/2002 | Baarman et al. | |
| 6,450,946 B1 | 9/2002 | Forsell | |
| 6,452,465 B1 | 9/2002 | Brown et al. | |
| 6,459,175 B1 * | 10/2002 | Potega .................. | B60L 11/185 307/132 M |
| 6,459,218 B2 | 10/2002 | Boys et al. | |
| 6,473,028 B1 | 10/2002 | Luc | |
| 6,483,202 B1 | 11/2002 | Boys | |
| 6,515,878 B1 | 2/2003 | Meins et al. | |
| 6,535,133 B2 | 3/2003 | Gohara | |
| 6,561,975 B1 | 5/2003 | Pool et al. | |
| 6,563,425 B2 | 5/2003 | Nicholson et al. | |
| 6,597,076 B2 | 7/2003 | Scheible et al. | |
| 6,609,023 B1 | 8/2003 | Fischell et al. | |
| 6,631,072 B1 | 10/2003 | Paul et al. | |
| 6,650,227 B1 | 11/2003 | Bradin | |
| 6,664,770 B1 | 12/2003 | Bartels | |
| 6,673,250 B2 | 1/2004 | Kuennen et al. | |
| 6,683,256 B2 | 1/2004 | Kao | |
| 6,696,647 B2 | 2/2004 | Ono et al. | |
| 6,703,921 B1 | 3/2004 | Wuidart et al. | |
| 6,731,071 B2 | 5/2004 | Baarman | |
| 6,749,119 B2 | 6/2004 | Scheible et al. | |
| 6,772,011 B2 | 8/2004 | Dolgin | |
| 6,798,716 B1 | 9/2004 | Charych | |
| 6,803,744 B1 | 10/2004 | Sabo | |
| 6,806,649 B2 | 10/2004 | Mollema et al. | |
| 6,812,645 B2 | 11/2004 | Baarman | |
| 6,825,620 B2 | 11/2004 | Kuennen et al. | |
| 6,831,417 B2 | 12/2004 | Baarman | |
| 6,839,035 B1 | 1/2005 | Addonisio et al. | |
| 6,844,702 B2 | 1/2005 | Giannopoulos et al. | |
| 6,856,291 B2 | 2/2005 | Mickle et al. | |
| 6,858,970 B2 | 2/2005 | Malkin et al. | |
| 6,906,495 B2 | 6/2005 | Cheng et al. | |
| 6,917,163 B2 | 7/2005 | Baarman | |
| 6,917,431 B2 | 7/2005 | Soljacic et al. | |
| 6,937,130 B2 | 8/2005 | Scheible et al. | |
| 6,960,968 B2 | 11/2005 | Odendaal et al. | |
| 6,961,619 B2 | 11/2005 | Casey | |
| 6,967,462 B1 | 11/2005 | Landis | |
| 6,975,198 B2 | 12/2005 | Baarman | |
| 6,988,026 B2 | 1/2006 | Breed et al. | |
| 7,027,311 B2 | 4/2006 | Vanderelli et al. | |
| 7,035,076 B1 | 4/2006 | Stevenson | |
| 7,042,196 B2 | 5/2006 | Ka-Lai et al. | |
| 7,069,064 B2 | 6/2006 | Govorgian et al. | |
| 7,084,605 B2 | 8/2006 | Mickle et al. | |
| 7,116,200 B2 | 10/2006 | Baarman et al. | |
| 7,118,240 B2 | 10/2006 | Baarman et al. | |
| 7,126,450 B2 | 10/2006 | Baarman et al. | |
| 7,127,293 B2 | 10/2006 | MacDonald | |
| 7,132,918 B2 | 11/2006 | Baarman et al. | |

(56) References Cited

U.S. PATENT DOCUMENTS

| | | |
|---|---|---|
| 7,147,604 B1 | 12/2006 | Allen et al. |
| 7,180,248 B2 | 2/2007 | Kuennen et al. |
| 7,191,007 B2 | 3/2007 | Desai et al. |
| 7,193,418 B2 | 3/2007 | Freytag |
| D541,322 S | 4/2007 | Garrett et al. |
| 7,212,414 B2 | 5/2007 | Baarman |
| 7,233,137 B2 | 6/2007 | Nakamura et al. |
| D545,855 S | 7/2007 | Garrett et al. |
| 7,239,110 B2 | 7/2007 | Cheng et al. |
| 7,248,017 B2 | 7/2007 | Cheng et al. |
| 7,251,527 B2 | 7/2007 | Lyden |
| 7,288,918 B2 | 10/2007 | DiStefano |
| 7,340,304 B2 | 3/2008 | MacDonald |
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |
| 7,385,357 B2 | 6/2008 | Kuennen et al. |
| 7,443,135 B2 | 10/2008 | Cho |
| 7,462,951 B1 | 12/2008 | Baarman |
| 7,466,213 B2 | 12/2008 | Lobl et al. |
| 7,471,062 B2 | 12/2008 | Bruning |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,521,890 B2 | 4/2009 | Lee et al. |
| 7,525,283 B2 | 4/2009 | Cheng et al. |
| 7,545,337 B2 | 6/2009 | Guenther |
| 7,554,316 B2 | 6/2009 | Stevens et al. |
| 7,599,743 B2 | 10/2009 | Hassler, Jr. et al. |
| 7,615,936 B2 | 11/2009 | Baarman et al. |
| 7,639,514 B2 | 12/2009 | Baarman |
| 7,723,952 B2 * | 5/2010 | Phillips ............... B25F 5/00 307/150 |
| 7,741,734 B2 | 6/2010 | Joannopoulos et al. |
| 7,795,708 B2 | 9/2010 | Katti |
| 7,825,543 B2 | 11/2010 | Karalis et al. |
| 7,825,544 B2 | 11/2010 | Jansen et al. |
| 7,835,417 B2 | 11/2010 | Heideman et al. |
| 7,843,288 B2 | 11/2010 | Lee et al. |
| 7,844,306 B2 | 11/2010 | Shearer et al. |
| 7,863,859 B2 | 1/2011 | Soar |
| 7,880,337 B2 | 2/2011 | Farkas |
| 7,884,697 B2 | 2/2011 | Wei et al. |
| 7,885,050 B2 | 2/2011 | Lee |
| 7,919,886 B2 | 4/2011 | Tanaka |
| 7,923,870 B2 | 4/2011 | Jin |
| 7,932,798 B2 | 4/2011 | Tolle et al. |
| 7,948,209 B2 | 5/2011 | Jung |
| 7,952,322 B2 | 5/2011 | Partovi et al. |
| 7,963,941 B2 | 6/2011 | Wilk |
| 7,969,045 B2 | 6/2011 | Schmidt et al. |
| 7,994,880 B2 | 8/2011 | Chen et al. |
| 7,999,506 B1 | 8/2011 | Hollar et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,106,539 B2 | 1/2012 | Schatz et al. |
| 8,115,448 B2 | 2/2012 | John |
| 8,131,378 B2 | 3/2012 | Greenberg et al. |
| 8,178,995 B2 | 5/2012 | Amano et al. |
| 8,193,769 B2 | 6/2012 | Azancot et al. |
| 8,212,414 B2 | 7/2012 | Howard et al. |
| 8,260,200 B2 | 9/2012 | Shimizu et al. |
| 8,304,935 B2 | 11/2012 | Karalis et al. |
| 8,324,759 B2 | 12/2012 | Karalis et al. |
| 8,334,620 B2 | 12/2012 | Park et al. |
| 8,362,651 B2 | 1/2013 | Hamam et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,441,154 B2 | 5/2013 | Karalis et al. |
| 8,457,547 B2 | 6/2013 | Meskens |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,157 B2 | 7/2013 | Cook et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,552,592 B2 | 10/2013 | Schatz et al. |
| 8,569,914 B2 | 10/2013 | Karalis et al. |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Karalis et al. |
| 8,629,578 B2 | 1/2014 | Kurs et al. |
| 8,643,326 B2 | 2/2014 | Campanella et al. |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0160590 A1 | 8/2003 | Schaefer et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0007399 A1* | 1/2004 | Heinzmann ............ A63C 17/12 180/7.1 |
| 2004/0026998 A1 | 2/2004 | Henriott et al. |
| 2004/0100338 A1 | 5/2004 | Clark |
| 2004/0113847 A1 | 6/2004 | Qi et al. |
| 2004/0130425 A1 | 7/2004 | Dayan et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman |
| 2004/0233043 A1 | 11/2004 | Yazawa et al. |
| 2004/0254676 A1* | 12/2004 | Blust ............... G06Q 10/087 700/231 |
| 2004/0267501 A1 | 12/2004 | Freed et al. |
| 2005/0007067 A1 | 1/2005 | Baarman et al. |
| 2005/0021134 A1 | 1/2005 | Opie |
| 2005/0027192 A1 | 2/2005 | Govari et al. |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0116683 A1 | 6/2005 | Cheng et al. |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |

(56) References Cited

U.S. PATENT DOCUMENTS

| | | |
|---|---|---|
| 2005/0127866 A1 | 6/2005 | Hamilton et al. |
| 2005/0135122 A1 | 6/2005 | Cheng et al. |
| 2005/0140482 A1 | 6/2005 | Cheng et al. |
| 2005/0151511 A1 | 7/2005 | Chary |
| 2005/0156560 A1 | 7/2005 | Shimaoka et al. |
| 2005/0189945 A1 | 9/2005 | Reiderman |
| 2005/0194926 A1 | 9/2005 | DiStefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0001509 A1 | 1/2006 | Gibbs |
| 2006/0010902 A1 | 1/2006 | Trinh et al. |
| 2006/0022636 A1 | 2/2006 | Xian et al. |
| 2006/0053296 A1 | 3/2006 | Busboom et al. |
| 2006/0061323 A1 | 3/2006 | Cheng et al. |
| 2006/0066443 A1 | 3/2006 | Hall |
| 2006/0087283 A1* | 4/2006 | Phillips ............... B25F 5/00 320/114 |
| 2006/0090956 A1 | 5/2006 | Peshkovskiy et al. |
| 2006/0132045 A1 | 6/2006 | Baarman |
| 2006/0164866 A1 | 7/2006 | Vanderelli et al. |
| 2006/0181242 A1 | 8/2006 | Freed et al. |
| 2006/0184209 A1 | 8/2006 | John et al. |
| 2006/0184210 A1 | 8/2006 | Singhal et al. |
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0067678 A1* | 3/2007 | Hosek ............... G05B 23/0235 714/25 |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0164839 A1 | 7/2007 | Naito |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0257636 A1 | 11/2007 | Phillips et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0034258 A1* | 2/2008 | Moriya ............... G05B 19/4184 714/57 |
| 2008/0036588 A1 | 2/2008 | Iverson et al. |
| 2008/0047727 A1 | 2/2008 | Sexton et al. |
| 2008/0051854 A1 | 2/2008 | Bulkes et al. |
| 2008/0054638 A1 | 3/2008 | Greene et al. |
| 2008/0067874 A1 | 3/2008 | Tseng |
| 2008/0132909 A1 | 6/2008 | Jascob et al. |
| 2008/0133300 A1* | 6/2008 | Jalinous ............... G06Q 10/0635 705/7.28 |
| 2008/0154331 A1 | 6/2008 | John et al. |
| 2008/0176521 A1 | 7/2008 | Singh et al. |
| 2008/0191638 A1 | 8/2008 | Kuennen et al. |
| 2008/0197710 A1 | 8/2008 | Kreitz et al. |
| 2008/0197802 A1 | 8/2008 | Onishi et al. |
| 2008/0211320 A1 | 9/2008 | Cook et al. |
| 2008/0238364 A1 | 10/2008 | Weber et al. |
| 2008/0255901 A1 | 10/2008 | Carroll et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0291277 A1 | 11/2008 | Jacobsen et al. |
| 2008/0300657 A1 | 12/2008 | Stultz |
| 2008/0300660 A1 | 12/2008 | John |
| 2008/0301152 A1* | 12/2008 | Kollgaard ............... G06Q 50/00 |
| 2009/0010028 A1 | 1/2009 | Baarmen et al. |
| 2009/0015075 A1 | 1/2009 | Cook et al. |
| 2009/0033280 A1 | 2/2009 | Choi et al. |
| 2009/0033564 A1 | 2/2009 | Cook et al. |
| 2009/0038623 A1 | 2/2009 | Farbarik et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0072782 A1 | 3/2009 | Randall |
| 2009/0079268 A1 | 3/2009 | Cook et al. |
| 2009/0079387 A1 | 3/2009 | Jin et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0115628 A1 | 5/2009 | Dicks et al. |
| 2009/0127937 A1 | 5/2009 | Widmer et al. |
| 2009/0134712 A1 | 5/2009 | Cook et al. |
| 2009/0139781 A1* | 6/2009 | Straubel ............... B60L 50/64 180/65.1 |
| 2009/0145674 A1* | 6/2009 | Lee ............... B60K 6/405 180/65.1 |
| 2009/0146892 A1 | 6/2009 | Shimizu et al. |
| 2009/0153273 A1 | 6/2009 | Chen |
| 2009/0160261 A1 | 6/2009 | Elo |
| 2009/0161078 A1 | 6/2009 | Wu et al. |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0218884 A1 | 9/2009 | Soar |
| 2009/0224608 A1 | 9/2009 | Cook et al. |
| 2009/0224609 A1 | 9/2009 | Cook et al. |
| 2009/0224723 A1 | 9/2009 | Tanabe |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0273318 A1 | 11/2009 | Rondoni et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |

(56) References Cited

U.S. PATENT DOCUMENTS

| | | |
|---|---|---|
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0305628 A1 | 12/2009 | Vavik |
| 2009/0308933 A1 | 12/2009 | Osada |
| 2009/0322158 A1 | 12/2009 | Stevens et al. |
| 2009/0322280 A1 | 12/2009 | Kamijo et al. |
| 2010/0001687 A1* | 1/2010 | Watanabe .......... B60L 3/12 320/109 |
| 2010/0013431 A1 | 1/2010 | Liu |
| 2010/0015918 A1 | 1/2010 | Liu et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |
| 2010/0065352 A1 | 3/2010 | Ichikawa |
| 2010/0066349 A1 | 3/2010 | Lin et al. |
| 2010/0076524 A1 | 3/2010 | Forsberg et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0104031 A1 | 4/2010 | Lacour |
| 2010/0109443 A1 | 5/2010 | Cook et al. |
| 2010/0109445 A1 | 5/2010 | Kurs et al. |
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156345 A1 | 6/2010 | Phelps, III |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0179384 A1 | 7/2010 | Hoeg et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0181964 A1 | 7/2010 | Huggins et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0188183 A1 | 7/2010 | Shpiro |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201312 A1 | 8/2010 | Kirby et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0234922 A1 | 9/2010 | Forsell |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244767 A1 | 9/2010 | Turner et al. |
| 2010/0244839 A1 | 9/2010 | Yoshikawa |
| 2010/0248622 A1 | 9/2010 | Kirby et al. |
| 2010/0253152 A1 | 10/2010 | Karalis et al. |
| 2010/0253281 A1 | 10/2010 | Li |
| 2010/0256481 A1 | 10/2010 | Mareci et al. |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0314946 A1 | 12/2010 | Budde et al. |
| 2010/0327660 A1 | 12/2010 | Karalis et al. |
| 2010/0327661 A1 | 12/2010 | Karalis et al. |
| 2010/0328044 A1 | 12/2010 | Waffenschmidt et al. |

(56) References Cited

U.S. PATENT DOCUMENTS

| | | |
|---|---|---|
| 2011/0004269 A1 | 1/2011 | Strother et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0031928 A1 | 2/2011 | Soar |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049995 A1 | 3/2011 | Hashiguchi |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0133726 A1 | 6/2011 | Ballantyne et al. |
| 2011/0140544 A1 | 6/2011 | Karalis et al. |
| 2011/0144931 A1* | 6/2011 | Smit ............... H02H 7/261 702/59 |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0215086 A1 | 9/2011 | Yeh |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2011/0248573 A1 | 10/2011 | Kanno et al. |
| 2011/0254377 A1 | 10/2011 | Wildmer et al. |
| 2011/0254503 A1 | 10/2011 | Widmer et al. |
| 2011/0266878 A9 | 11/2011 | Cook et al. |
| 2011/0278943 A1 | 11/2011 | Eckhoff et al. |
| 2012/0001492 A9 | 1/2012 | Cook et al. |
| 2012/0001593 A1 | 1/2012 | DiGuardo |
| 2012/0007435 A1 | 1/2012 | Sada et al. |
| 2012/0007441 A1 | 1/2012 | John et al. |
| 2012/0025602 A1 | 2/2012 | Boys et al. |
| 2012/0032522 A1 | 2/2012 | Schatz et al. |
| 2012/0038525 A1 | 2/2012 | Monsalve Carcelen et al. |
| 2012/0062345 A1 | 3/2012 | Kurs et al. |
| 2012/0068549 A1 | 3/2012 | Karalis et al. |
| 2012/0083917 A1* | 4/2012 | Zhou ............... G05B 13/048 700/110 |
| 2012/0086284 A1 | 4/2012 | Campanella et al. |
| 2012/0086867 A1 | 4/2012 | Kesler et al. |
| 2012/0089410 A1* | 4/2012 | Mikurak ............ G06Q 10/00 705/1.1 |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0110356 A1* | 5/2012 | Yousefi ............. H04N 7/183 713/320 |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0136527 A1* | 5/2012 | McQuade .......... G06Q 30/0611 701/29.4 |
| 2012/0139355 A1 | 6/2012 | Ganem et al. |
| 2012/0146575 A1 | 6/2012 | Armstrong et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153741 A1 | 6/2012 | Yamamoto et al. |
| 2012/0153893 A1 | 6/2012 | Schatz et al. |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0265360 A1* | 10/2012 | Smit ............... H02H 7/262 700/293 |
| 2012/0267960 A1 | 10/2012 | Low et al. |
| 2012/0280765 A1 | 11/2012 | Kurs et al. |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0050882 A1* | 2/2013 | Rostron ............ H02H 3/083 361/44 |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0099587 A1 | 4/2013 | Lou et al. |
| 2013/0154383 A1 | 6/2013 | Kasturi et al. |
| 2013/0154389 A1 | 6/2013 | Kurs et al. |
| 2013/0159956 A1 | 6/2013 | Verghese et al. |
| 2013/0175874 A1 | 7/2013 | Lou et al. |
| 2013/0175875 A1 | 7/2013 | Kurs et al. |
| 2013/0200716 A1 | 8/2013 | Kesler et al. |
| 2013/0200721 A1 | 8/2013 | Kurs et al. |
| 2013/0221744 A1 | 8/2013 | Hall et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0300353 A1 | 11/2013 | Kurs et al. |
| 2013/0307349 A1 | 11/2013 | Hall et al. |
| 2013/0320773 A1 | 12/2013 | Schatz et al. |
| 2013/0334892 A1 | 12/2013 | Hall et al. |

(56) References Cited

U.S. PATENT DOCUMENTS

| | | | |
|---|---|---|---|
| 2014/0002012 A1 | 1/2014 | McCauley et al. | |
| 2014/0070764 A1 | 3/2014 | Keeling | |

FOREIGN PATENT DOCUMENTS

| | | |
|---|---|---|
| CN | 102439669 | 5/2012 |
| CN | 103329397 | 9/2013 |
| DE | 38 24 972 | 1/1989 |
| DE | 100 29147 | 12/2001 |
| DE | 200 16 655 | 3/2002 |
| DE | 102 21 484 | 11/2003 |
| DE | 103 04 584 | 8/2004 |
| DE | 10 2005 036290 | 2/2007 |
| DE | 10 2006 044057 | 4/2008 |
| EP | 1 335 477 | 8/2003 |
| EP | 1 521 206 | 4/2005 |
| EP | 1 524 010 | 4/2005 |
| EP | 2 357 716 | 8/2011 |
| JP | 02-097005 | 4/1990 |
| JP | 4-265875 | 9/1992 |
| JP | 6-341410 | 12/1994 |
| JP | 9-182323 | 7/1997 |
| JP | 9-298847 | 11/1997 |
| JP | 10-164837 | 6/1998 |
| JP | 11-75329 | 3/1999 |
| JP | 11-188113 | 7/1999 |
| JP | 2001-309580 | 11/2001 |
| JP | 2002-010535 | 1/2002 |
| JP | 2003-179526 | 6/2003 |
| JP | 2004-166459 | 6/2004 |
| JP | 2004-201458 | 7/2004 |
| JP | 2004-229144 | 8/2004 |
| JP | 2005-57444 | 3/2005 |
| JP | 2005-149238 | 6/2005 |
| JP | 2006-074848 | 3/2006 |
| JP | 2007-505480 | 3/2007 |
| JP | 2007-266892 | 10/2007 |
| JP | 2007-537637 | 12/2007 |
| JP | 2008-508842 | 3/2008 |
| JP | 2008-206231 | 9/2008 |
| JP | 2008-206327 | 9/2008 |
| JP | 2011-072074 | 4/2011 |
| JP | 2012-504387 | 2/2012 |
| JP | 2013-543718 | 12/2013 |
| KR | 10-2007-0017804 | 2/2007 |
| KR | 10-2008-0007635 | 1/2008 |
| KR | 10-2009-0122072 | 11/2009 |
| KR | 10-2011-0050920 | 5/2011 |
| SG | 112842 | 7/2005 |
| WO | WO 92/17929 | 10/1992 |
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/092329 | 11/2003 |
| WO | WO 03/096361 | 11/2003 |
| WO | WO 03/096512 | 11/2003 |
| WO | WO 2004/015885 | 2/2004 |
| WO | WO 2004/038888 | 5/2004 |
| WO | WO 2004/055654 | 7/2004 |
| WO | WO 2004/073150 | 8/2004 |
| WO | WO 2004/073166 | 8/2004 |
| WO | WO 2004/073176 | 8/2004 |
| WO | WO 2004/073177 | 8/2004 |
| WO | WO 2004/112216 | 12/2004 |
| WO | WO 2005/024865 | 3/2005 |
| WO | WO 2005/060068 | 6/2005 |
| WO | WO 2005/109597 | 11/2005 |
| WO | WO 2005/109598 | 11/2005 |
| WO | WO 2006/011769 | 2/2006 |
| WO | WO 2007/008646 | 1/2007 |
| WO | WO 2007/020583 | 2/2007 |
| WO | WO 2007/042952 | 4/2007 |
| WO | WO 2007/084716 | 7/2007 |
| WO | WO 2007/084717 | 7/2007 |
| WO | WO 2008/109489 | 9/2008 |
| WO | WO 2008/118178 | 10/2008 |
| WO | WO 2009/009559 | 1/2009 |
| WO | WO 2009/018568 | 2/2009 |
| WO | WO 2009/023155 | 2/2009 |
| WO | WO 2009/023646 | 2/2009 |
| WO | WO 2009/033043 | 3/2009 |
| WO | WO 2009/062438 | 5/2009 |
| WO | WO 2009/070730 | 6/2009 |
| WO | WO 2009/081115 | 7/2009 |
| WO | WO 2009/126963 | 10/2009 |
| WO | WO 2009/140506 | 11/2009 |
| WO | WO 2009/149464 | 12/2009 |
| WO | WO 2009/155000 | 12/2009 |
| WO | WO 2010/030977 | 3/2010 |
| WO | WO 2010/036980 | 4/2010 |
| WO | WO 2010/039967 | 4/2010 |
| WO | WO 2010/090538 | 8/2010 |
| WO | WO 2010/090539 | 8/2010 |
| WO | WO 2010/093997 | 8/2010 |
| WO | WO 2010/104569 | 9/2010 |
| WO | WO 2011/061388 | 5/2011 |
| WO | WO 2011/061821 | 5/2011 |
| WO | WO 2011/062827 | 5/2011 |
| WO | WO 2011/112795 | 9/2011 |
| WO | WO 2012/037279 | 3/2012 |
| WO | WO 2012/170278 | 12/2012 |
| WO | WO 2013/013235 | 1/2013 |
| WO | WO 2013/020138 | 2/2013 |
| WO | WO 2013/036947 | 3/2013 |
| WO | WO 2013/059441 | 4/2013 |
| WO | WO 2013/067484 | 5/2013 |
| WO | WO 2013/113017 | 8/2013 |
| WO | WO 2013/142840 | 9/2013 |
| WO | WO 2014/004843 | 1/2014 |

OTHER PUBLICATIONS

"Physics Update, Unwired Energy", *Physics Today*, pp. 26, (Jan. 2007) (See http://arxiv.org/abs/physics/0611063.).

"In pictures: A year in technology", *BBC News*, (Dec. 28, 2007).

"Next Little Thing 2010 Electricity without wires", CNN Money (See money.cnn.com/galleries/2009/smallbusiness/0911/gallery.next_little_thing_2010.smb/) (dated Nov. 30, 2009).

Abe et al. "A Noncontact Charger Using a Resonant Converter with Parallel Capacitor of the Secondary Coil". IEEE, 36(2):444-451, Mar./Apr. 2000.

Ahmadian, M. et al., "Miniature Transmitter for Implantable Micro Systems", *Proceedings of the 25th Annual International Conference of the IEEE EMBS Cancun, Mexico*, pp. 3028-3031 (Sep. 17-21, 2003).

Aoki, T. et al., "Observation of strong coupling between one atom and a monolithic microresonator", Nature, vol. 443:671-674 (2006).

Apneseth et al. "Introducing wireless proximity switches" ABB Review Apr. 2002.

Aristeidis Karalis et al., "Efficient Wireless non-radiative mid-range energy transfer", *Annals of Physics*, vol. 323, pp. 34-48 (2008).

Baker et al., "Feedback Analysis and Design of RF Power Links for Low-Power Bionic Systems," *IEEE Transactions on Biomedical Circuits and Systems*, vol. 1(1):28-38 (Mar. 2007).

Balanis, C.A., "Antenna Theory: Analysis and Design," 3rd Edition, Sections 4.2, 4.3, 5.2, 5.3 (Wiley, New Jersey, 2005).

Berardelli, P., "Outlets Are Out", ScienceNOW Daily News, Science Now, http://sciencenow.sciencemag.org/ cgi/content/full/2006/1114/2, (Nov. 14, 2006) 2 pages.

Biever, C., "Evanescent coupling' could power gadgets wirelessly", NewScientistsTech.com, http://www. newscientisttech.com/article.ns?id=dn1 0575&print=true, (Nov. 15, 2006) 2 pages.

Borenstein, S., "Man tries wirelessly boosting batteries", (The Associated Press), USA Today, (Nov. 16, 2006) 1 page.

Borenstein, S., "Man tries wirelessly boosting batteries", AP Science Writer, Boston.com, (See http://www.boston.com/business/technology/articles/2006/11/15/man_tries_wirelessly_b . . . ) (Nov. 15, 2006).

(56) References Cited

OTHER PUBLICATIONS

Boyle, A., "Electro-nirvana? Not so fast", MSNBC, http:/lcosmiclog.msnbc.msn.com/_news/2007/06/08/4350760- electro-nirvana-not-so-fast, (Jun. 8, 2007) 1 page.
Budhia, M. et al., "A New IPT Magnetic Coupler for Electric Vehicle Charging Systems", IECON 2010—36th Annual Conference on IEEE Industrial Electronics Society, Glendale, AZ, pp. 2487-2492 (Nov. 7-10, 2010).
Budhia, M. et al., "Development and evaluation of single sided flux couplers for contactless electric vehicle charging", 2011 IEEE Energy Conversion Congress and Exposition (ECCE), Phoenix, AZ, pp. 614-621 (Sep. 17-22, 2011).
Budhia, M. et al.,"Development of a Single-Sided Flux Magnetic Coupler for Electric Vehicle IPT", *IEEE Transactions on Industrial Electronics*, vol. 60:318-328 (Jan. 2013).
Bulkeley, W. M., "MIT Scientists Pave the Way for Wireless Battery Charging", The Wall Street Journal (See http://online.wsj.com/article/SB118123955549228045.html?mod=googlenews_wsj), (Jun. 8, 2007) 2 pages.
Burri et al., "Invention Description", (Feb. 5, 2008).
Cass, S., "Air Power—Wireless data connections are common—now scientists are working on wireless power", Sponsored by IEEE Spectrum, http://spectrum.ieee.org/computing/hardware/air-power, (Nov. 2006) 2 pages.
Castelvecchi, Davide, "The Power of Induction—Cutting the last cord could resonate with our increasingly gadget dependent lives", *Science News Online*, vol. 172, No. 3, Jul. 21, 2007, 6 pages.
Chang, A., "Recharging the Wireless Way—Even physicists forget to recharge their cell phones sometimes.", PC Magazine, ABC News Internet Ventures, (Dec. 12, 2006) 1 page.
Chinaview, , "Scientists light bulb with 'wireless electricity'",www.Chinaview.cn, http://news.xinhuanet.com/english/2007-06/08/content_6215681.htm,Jun. 2007,1 page.
Cooks, G., "The vision of an MIT physicist: Getting rid of pesky rechargers", Boston.com, (Dec. 11, 2006) 1 page.
Derbyshire, D., "The end of the plug? Scientists invent wireless device that beams electricity through your home", Daily Mail, http://www.dailymail.co.uk/pages/live/articles/technology/technology.html?in_article_id=4 . . . ), (Jun. 7, 2007) 3 pages.
Eisenberg, Anne, "Automatic Recharging, From a Distance", The New York Times, (see www.nytimes.com/2012/03/11/business/built-in-wireless-chargeing-for-electronic-devices.html?_r=0) (published on Mar. 10, 2012).
Esser et al., "A New Approach to Power Supplies for Robots", IEEE, vol. 27(5):872-875, (Sep./Oct. 1991).
Fan, Shanhui et al., "Rate-Equation Analysis of Output Efficiency and Modulation Rate of Photomic-Crystal Light-Emitting Diodes", IEEE Journal of Quantum Electronics, vol. 36(10):1123-1130 (Oct. 2000).
Fenske et al., "Dielectric Materials at Microwave Frequencies", Applied Microwave & Wireless, pp. 92-100 (2000).
Fernandez, C. et al., "A simple dc-dc converter for the power supply of a cochlear implant", *IEEE*, pp. 1965-1970 (2003).
Ferris, David, "How Wireless Charging Will Make Life Simpler (and Greener)", Forbes (See forbes.com/sites/davidferris/2012/07/24/how-wireless-charging-will-make-life-simpler-and-greener/print/) (dated Jul. 24, 2012).
Fildes, J., "Physics Promises Wireless Power", (Science and Technology Reporter), BBC News, (Nov. 15, 2006) 3 pages.
Fildes, J., "The technology with impact 2007", BBC News, (Dec. 27, 2007) 3 pages.
Fildes, J., "Wireless energy promise powers up", BBC News, http://news.bbc.co.uk/2/hi/technology/6725955.stm, (Jun. 7, 2007) 3 pages.
Finkenzeller, Klaus, "RFID Handbook—Fundamentals and Applications in Contactless Smart Cards", Nikkan Kohgyo-sya, Kanno Taihei, first version, pp. 32-37, 253 (Aug. 21, 2001).
Finkenzeller, Klaus, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).

Freedman, D.H., "Power on a Chip", MIT Technology Review, (Nov. 2004).
Gary Peterson, "MIT WiTricity Not So Original After All", *Feed Line No. 9*, (See http://www.tfcbooks.com/articles/witricity.htm) printed Nov. 12, 2009.
Geyi, Wen, "A Method for the Evaluation of Small Antenna Q", IEEE Transactions on Antennas and Propagation, vol. 51(8):2124-2129 (Aug. 2003).
Hadley, F., "Goodbye Wires—MIT Team Experimentally Demonstrates Wireless Power Transfer, Potentially Useful for Power Laptops, Cell-Phones Without Cords", Massachusetts Institute of Technology, Institute for Soldier D Nanotechnologies, http://web.mit.edu/newsoffice/2007/wireless-0607.html, (Jun. 7, 2007) 3 pages.
Haus, H.A., "Waves and Fields in Optoelectronics," Chapter 7 "Coupling of Modes—Reasonators and Couplers" (Prentice-Hall, New Jersey, 1984).
Heikkinen et al., "Performance and Efficiency of Planar Rectennas for Short-Range Wireless Power Transfer at 2.45 GHz", Microwave and Optical Technology Letters, vol. 31(2):86-91, (Oct. 20, 2001).
Highfield, R., "Wireless revolution could spell end of plugs-",(Science Editor), Telegraph.co.uk, http://www. telegraph.co.uk/news/main.jhtml?xml=/news/2007/06/07/nwireless1 07.xml, (Jun. 7, 2007) 3 pages.
Hirai et al., "Integral Motor with Driver and Wireless Transmission of Power and Information for Autonomous Subspindle Drive", IEEE, vol. 15(1):13-20, (Jan. 2000).
Hirai et al., "Practical Study on Wireless Transmission of Power and Information for Autonomous Decentralized Manufacturing System", IEEE, vol. 46(2):349-359, Apr. 1999.
Hirai et al., "Study on Intelligent Battery Charging Using Inductive Transmission of Power and Information", IEEE, vol. 15(2):335-345, (Mar. 2000).
Hirai et al., "Wireless Transmission of Power and Information and Information for Cableless Linear Motor Drive", IEEE, vol. 15(1):21-27, (Jan. 2000).
Hirayama, M., "Splashpower—World Leaders in Wireless Power", PowerPoint presentation, Splashpower Japan, (Sep. 3, 2007) 30 pages.
Ho, S. L. et al., "A Comparative Study Between Novel Witricity and Traditional Inductive Magnetic Coupling in Wireless Charging", IEEE Transactions on Magnetics, vol. 47(5):1522-1525 (May 2011).
Infotech Online, "Recharging gadgets without cables", infotech.indiatimes.com, (Nov. 17, 2006) 1 page.
Jackson, J. D., "Classical Electrodynamics", 3rd Edition, Wiley, New York, 1999, pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Jacob, M. V. et al., "Lithium Tantalate—A High Permittivity Dielectric Material for Microwave Communication Systems", *Proceedings of IEEE TENCON—Poster Papers*, pp. 1362-1366, 2003.
Karalis, Aristeidis, "Electricity Unplugged", Feature: Wireless Energy Physics World, physicsworld.com, pp. 23-25 (Feb. 2009).
Kawamura et al., "Wireless Transmission of Power and Information Through One High-Frequency Resonant AC Link Inverter for Robot Manipulator Applications", IEEE, vol. 32(3):503-508, (May/Jun. 1996).
Kurs, A. et al., "Wireless Power Transfer via Strongly Coupled Magnetic Resonances", *Science* vol. 317, pp. 83-86 (Jul. 6, 2007).
Kurs, A. et al., "Simultaneous mid-range power transfer to multiple devices", *Applied Physics Letters*, vol. 96, No. 044102 (2010).
Kurs, A. et al.,"Optimized design of a low-resistance electrical conductor for the multimegahertz range", *Applied Physics Letters*, vol. 98:172504-172504-3 (Apr. 2011).
Lamb, Gregory M. ,"Look Ma—no wires!—Electricity broadcast through the air may someday run your home",The Christian Science Monitor,http://www.csmonitor.com/2006/1116/p14s01-stct.html,Nov. 15, 2006,2 pages.
Lee, "Antenna Circuit Design for RFID Applications," Microchip Technology Inc., AN710, 50 pages (2003).
Lee, "RFID Coil Design," Microchip Technology Inc., AN678, 21 pages (1998).

(56) References Cited

OTHER PUBLICATIONS

Liang et al., "Silicon waveguide two-photon absorption detector at 1.5 μm wavelength for autocorrelation measurements," Applied Physics Letters, 81(7):1323-1325 (Aug. 12, 2002).
Markoff, J. ,"Intel Moves to Free Gadgets of Their Recharging Cords", The New York Times—nytimes.com, Aug. 21, 2008, 2 pages.
Mediano, A. et al. "Design of class E amplifier with nonlinear and linear shunt capacitances for any duty cycle", IEEE Trans. Microwave Theor. Tech., vol. 55, No. 3, pp. 484-492, (2007).
Microchip Technology Inc., "microID 13.56 MHz Design Guide—MCRF355/360 Reader Reference Design," 24 pages (2001).
Minkel, J R. ,"Wireless Energy Lights Bulb from Seven Feet Away—Physicists vow to cut the cord between your laptop battery and the wall socket—with just a simple loop of wire",Scientific American,http://www.scientificamerican.com/article.cfm?id=wireless-energy-lights-bulb-from-seven-feet-away,Jun. 7, 2007,1 page.
Minkel, J R. ,"Wireless Energy Transfer May Power Devices at a Distance",Scientific American,Nov. 14, 2006,1 page.
Morgan, J., "Lab report: Pull the plug for a positive charge", The Herald, Web Issue 2680, (Nov. 16, 2006) 3 pages.
Moskvitch, Katia, "Wireless charging—the future for electric cars?", BBC News Technology (See www.bbc.co.uk/news/technology-14183409) (dated Jul. 21, 2011).
O'Brien et al., "Analysis of Wireless Power Supplies for Industrial Automation Systems", IEEE, pp. 367-372 (Nov. 2-6, 2003).
O'Brien et al., "Design of Large Air-Gap Transformers for Wireless Power Supplies", IEEE, pp. 1557-1562 (Jun. 15-19, 2003).
Pendry, J. B., "A Chiral Route to Negative Refraction", Science, vol. 306:1353-1355 (2004).
Physics Today, "Unwired energy questions asked answered", Sep. 2007, pp. 16-17.
Powercast LLC. "White Paper" Powercast simply wire free, 2003.
PR News Wire, "The Big Story for CES 2007: The public debut of eCoupled Intelligent Wireless Power", Press Release, Fulton Innovation LLC, Las Vegas, NV, (Dec. 27, 2006) 3 pages.
Press Release, "The world's first sheet-type wireless power transmission system: Will a socket be replaced by e-wall?",Public Relations Office, School of Engineering, University of Tokyo, Japan,Dec. 12, 2006,4 pages.
PressTV, "Wireless power transfer possible", http://edition.presstv.ir/detail/12754.html, Jun. 11, 2007, 1 page.
Reidy, C. (Globe Staff), "MIT discovery could unplug your iPod forever", Boston.com, http://www.boston.com/ business/ticker/2007/06/mit_discovery_c.html, (Jun. 7, 2007) 3 pages.
Risen, C., "Wireless Energy", The New York Times, (Dec. 9, 2007) 1 page.
Sakamoto et al., "A Novel Circuit for Non-Contact Charging Through Electro-Magnetic Coupling", IEEE, pp. 168-174 (1992).
Scheible, G. et al., "Novel Wireless Power Supply System for Wireless Communication Devices in Industrial Automation Systems", IEEE, pp. 1358-1363, (Nov. 5-8, 2002).
Schneider, D. "A Critical Look at Wireless Power", *IEEE Spectrum*, pp. 35-39 (May 2010).
Schneider, David, "Electrons Unplugged. Wireless power at a distance is still far away", *IEEE Spectrum*, pp. 35-39 (May 2010).
Schuder, J. C. et al., "An Inductively Coupled RF System for the Transmission of 1 kW of Power Through the Skin", *IEEE Transactions on Bio-Medical Engineering*, vol. BME-18, No. 4, pp. 265-273 (Jul. 1971).
Schuder, J. C., "Powering an Artificial Heart: Birth of the Inductively Coupled-Radio Frequency System in 1960", *Artificial Organs*, vol. 26:909-915 (2002).
Schuder, J.C. et al., "Energy Transport Into the Closed Chest From a Set of Very-Large Mutually Orthogonal Coils", Communication Electronics, vol. 64:527-534 (Jan. 1963).
Schutz, J. et al., "Load Adaptive Medium Frequency Resonant Power Supply", IEEE, pp. 282-287 (Nov. 2002).

Sekitani et al. "A large-area wireless power-transmission sheet using printed organic transistors and plastic MEMS switches" www.nature.com/naturematerials. Published online Apr. 29, 2007.
Sekitani et al., "A large-area flexible wireless power transmission sheet using printed plastic MEMS switches and organic field-effect transistors", IEDM '06, International Electron Devices Meeting, (Dec. 11-13, 2006) 4 pages.
Sekiya, H. et al., "FM/PWM control scheme in class DE inverter", IEEE Trans. Circuits Syst. I, vol. 51(7) (Jul. 2004).
Senge, M., "MIT's wireless electricity for mobile phones", Vanguard, http://www.vanguardngr.com/articles/2002/features/gsm/gsm211062007.htm, (Jun. 11, 2007) 1 page.
Sensiper, S., "Electromagnetic wave propogation on helical conductors", Technical Report No. 194 (based on PhD Thesis), Massachusetts Institute of Technology, (May 16, 1951) 126 pages.
Soljacic, M. , "Wireless Non-Radiative Energy Transfer—PowerPoint presentation". Massachusetts Institute of Technology, (Oct. 6, 2005).
Soljacic, M. et al., "Wireless Energy Transfer Can Potentially Recharge Laptops Cell Phones Without Cords", (Nov. 14, 2006) 3 pages.
Soljacic, M. et al., "Photonic-crystal slow-light enhancement of nonlinear phase sensitivity", *J. Opt. Soc. Am B*, vol. 19, No. 9, pp. 2052-2059 (Sep. 2002).
Soljacic, M., "Wireless nonradiative energy transfer", *Visions of Discovery New Light on Physics, Cosmology, and Consciousness*, Cambridge University Press, New York, NY pp. 530-542 (2011).
Someya, Takao. "The world's first sheet-type wireless power transmission system". University of Tokyo, (Dec. 12, 2006).
Staelin, David H. et al., Electromagnetic Waves, Chapters 2, 3, 4, and 8, pp. 46-176 and 336-405 (Prentice Hall Upper Saddle River, New Jersey 1998).
Stark III, Joseph C., "Wireless Power Transmission Utilizing a Phased Array of Tesla Coils", Master Thesis, Massachusetts Institute of Technology (2004).
Stewart, W., "The Power to Set you Free", Science, vol. 317:55-56 (Jul. 6, 2007).
Tang, S.C. et al., "Evaluation of the Shielding Effects on Printed-Circuit-Board Transformers Using Ferrite Plates and Copper Sheets", *IEEE Transactions on Power Electronics*, vol. 17:1080-1088 (Nov. 2002).
Tesla, Nikola, "High Frequency Oscillators for Electro-Therapeutic and Other Purposes", *Proceedings of the IEEE*, vol. 87:1282-1292 (Jul. 1999).
Tesla, Nikola, "High Frequency Oscillators for Electro-Therapeutic and Other Purposes", *The Electrical Engineer*, vol. XXVI, No. 50 (Nov. 17, 1898).
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Valtchev et al. "Efficient Resonant Inductive Coupling Energy Transfer Using New Magnetic and Design Criteria". IEEE, pp. 1293-1298, 2005.
Vandevoorde et al., "Wireless energy transfer for stand-alone systems: a comparison between low and high power applicability", Sensors and Actuators, vol. 92:305-311 (2001).
Vilkomerson, David et al., "Implantable Doppler System for Self-Monitoring Vascular Grafts", *IEEE Ultrasonics Symposium*, pp. 461-465 (2004).
Villeneuve, Pierre R. et al., "Microcavities in photonic crystals: Mode symmetry, tunability, and coupling efficiency", *Physical Review B*, vol. 54:7837-7842 (Sep. 15, 1996).
Yariv, Amnon et al., "Coupled-resonator optical waveguide: a proposal and analysis", *Optics Letters*, vol. 24(11):711-713 (Jun. 1, 1999).
Yates, David C. et al., "Optimal Transmission Frequency for Ultralow-Power Short-Range Radio Links", IEEE Transactions on Circuits and Systems—1, Regular Papers, vol. 51:1405-1413 (Jul. 2004).

(56) References Cited

OTHER PUBLICATIONS

Yoshihiro Konishi, *Microwave Electronic Circuit Technology*, Chapter 4, pp. 145-197 (Marcel Dekker, Inc., New York, NY 1998).
Ziaie, Babak et al., "A Low-Power Miniature Transmitter Using a Low-Loss Silicon Platform for Biotelemetry", *Proceedings—19th International Conference IEEE/EMBS*, pp. 2221-2224, (Oct. 30-Nov. 2, 1997) 4 pages.
Zierhofer, Clemens M. et al., "High-Efficiency Coupling-Insensitive Transcutaneous Power and Data Transmission Via an Inductive Link", *IEEE Transactions on Biomedical Engineering*, vol. 37, No. 7, pp. 716-722 (Jul. 1990).
PCT/US2011/054544, International Search Report and Written Opinion for PCT/US2011/054544, dated Jan. 30, 2012, 17 pages.
PCT/US2012/054490, International Search Report and Written Opinion for PCT/US2012/054490, dated Feb. 28, 2013, 8 pages.

\* cited by examiner

Fig. 4

| Step | Action | Initiator | Design Feature |
|---|---|---|---|
| 1 | Vehicle approach (<10 m) | vehicle | wake-up rf comm |
| 2 | Near range detection (<0.3 m) | source | FOD coil on source; rf comm |
| 3 | Charge request | vehicle | auto or driver button; rf comm |
| 4 | Handshaking and confirmation request | source | config, calibration, ID; rf comm |
| 5 | Start charging | source | |
| 6 | Monitor and log | both | CPUs |
| 7 | Hazard detestion: FOD, over-lim, breakage | both | fast and slow event loops |
| 8 | End charging | vehicle | rf comm |
| 9 | Notifiy end of chard and status | source | rf comm |

| Address | Mode | Description |
|---|---|---|
| Communication Control Parameters | | |
| | RW | Application Device Processor IP address |
| | RW | Application Device Processor IP Port number |
| Operating Control Parameters | | |
| | RW | Frequency (valid range is specific to hardware) |
| | RW | Level 1 Operating Voltage |
| | RW | Level 1 Operating Current |
| | RW | Initial Voltage Level |
| | RW | Stabilization Delay |
| | RW | Level 2 Operating Voltage |
| | RW | Level 2 Operating Current |
| | RW | Level 1 Efficiency Warning Threshold |
| | RW | Level 2 Efficiency Warning Threshold |
| | RW | Level 1 Efficiency Error Threshold |
| | RW | Level 2 Efficiency Error Threshold |
| | RW | Rectifier Voltage Measured (from ADP) |
| | RW | Rectifier Current Measured (from ADP) |
| | RW | Rectifier Power Measured (from ADP) |
| | RW | Amplifier Heatsink Temperature Warning Threshold |
| | RW | PFC Heatsink Temperature Warning Threshold |
| | RW | Source Coil Temperature Warning Threshold |
| | RW | Amplifier Heatsink Temperature Error Threshold |
| | RW | PFC Heatsink Temperature Error Threshold |
| | RW | Source Coil Temperature Error Threshold |
| | RW | Metal FOD Warning Threshold |
| | RW | Hot FOD Warning Threshold |
| | RW | Living-Being FOD Warning Threshold |
| | RW | Metal FOD Error Threshold |
| | RW | Hot FOD Error Threshold |
| | RW | Living-Being FOD Error Threshold |
| Status Monitor Parameters | | |
| | RO | State (Off, Avail, Docking, Coupled, Ready2Charge, Charging, Anomaly) |
| | RO | Frequency Measured |
| | RO | RF Comm Status |
| | RO | Source Voltage Measured |
| | RO | Source Current Measured |
| | RO | Source Power Measured |
| | RO | Source Coil Impedance Measured |
| | RO | Source Coil Impedance Measured |
| | RO | Metal FOD Detector Signal |

Fig. 13

| Address | Mode | Description |
|---|---|---|
| Communication Control Parameters | | |
| | RW | Application Device Processor IP address |
| | RW | Application Device Processor IP Port number |
| Operating Control Parameters | | |
| | RW | DC Output Current Setpoint |
| | RW | Low Voltage Warning Threshold |
| | RW | Low Voltage Error Threshold |
| | RW | Low Current Warning Threshold |
| | RW | Low Current Error Threshold |
| | RW | Rectifier Voltage Measured (from ADP) |
| | RW | Rectifier Current Measured (from ADP) |
| | RW | Rectifier Power Measured (from ADP) |
| | RW | Warning Threshold |
| | RW | Heatsink Temperature Warning Threshold |
| | RW | Device Coil Temperature Warning Threshold |
| | RW | Rectifier Heatsink Temperature Error Threshold |
| | | |
| Status Monitor Parameters | | |
| | RO | State (Driving, Searching, Docking, Coupled, Ready2Charge, Charging, Anomaly) |
| | RO | Frequency Measured |
| | RO | RF Comm Status |
| | RO | Rectifier Voltage Measured |
| | RO | Rectifier Current Measured |
| | RO | Rectifier Power Measured |
| | RO | Rectifier Heatsink Temperature |
| | RO | Device Coil Temperature |

Fig. 14

| Address | Mode | 7 | 6 | 5 | 4 | 3 | 2 | 1 | 0 |
|---|---|---|---|---|---|---|---|---|---|
| Common Control Registers | | | | | | | | | |
| BA+0x00 | RO | Global Interrupt Status Register | | | | | | | |
| BA+0x01 | RW | Global Interrupt Mask Register | | | | | | | |
| BA+0x02 | RO | Chip ID Register | | | | | | | |
| BA+0x03 | RO | Chip Revision Register | | | | | | | |
| BA+0x04 | RW | Scratchpad Register | | | | | | | |
| BA+0x05 | RO | Scratchpad Inverse Register | | | | | | | |
| BA+0x08 | RW | Reset Register | | | | | | | |
| | RW | Control 1 Register | | | | | | | |
| | RW | Control 2 Register | | | | | | | |
| | RO | Status Register | | | | | | | |
| PIM Interface Registers | | | | | | | | | |
| BA+0x10 | RW | PIM Control Register | | | | | | | |
| | RW | PIM Address Register | | | | | | | |
| | RW | PIM Data Register | | | | | | | |
| PFC Configuration Registers | | | | | | | | | |
| BA+0x20 | | TBD | | | | | | | |
| : | | TBD | | | | | | | |
| BA+0x3F | | TBD | | | | | | | |
| Amplifier Control Registers | | | | | | | | | |
| BA+0x40 – 0x43 | RW | Amplifier Voltage Set | | | | | | | |
| (32-bit values in | RW | Amplifier Current Set | | | | | | | |
| 4 byte-wide regs) | RO | Amplifier Voltage Measured | | | | | | | |
| | RO | Amplifier Current Measured | | | | | | | |
| | RO | Amplifier Power Measured | | | | | | | |
| | RW | Over Voltage Warning Threshold | | | | | | | |
| | RW | Over Current Warning Threshold | | | | | | | |
| | RW | Low Voltage Warning Threshold | | | | | | | |
| | RW | Low Current Warning Threshold | | | | | | | |
| | RW | Over Voltage Error Threshold | | | | | | | |
| | RW | Over Voltage Error Threshold | | | | | | | |
| | RW | Low Voltage Error Threshold | | | | | | | |
| | RW | Low Current Error Threshold | | | | | | | |

Fig. 15

| Address | Mode | 7 | 6 | 5 | 4 | 3 | 2 | 1 | 0 |
|---|---|---|---|---|---|---|---|---|---|
| Common Control Registers | | | | | | | | | |
| BA+0x00 | RO | Global Interrupt Status Register | | | | | | | |
| BA+0x01 | RW | Global Interrupt Mask Register | | | | | | | |
| BA+0x02 | RO | Chip ID Register | | | | | | | |
| BA+0x03 | RO | Chip Revision Register | | | | | | | |
| BA+0x04 | RW | Scratchpad Register | | | | | | | |
| BA+0x05 | RO | Scratchpad Inverse Register | | | | | | | |
| | | | | | | | | | |
| BA+0x08 | RW | Reset Register | | | | | | | |
| BA+0x09 | RW | Control Register | | | | | | | |
| BA+0x0A | RO | Status Register | | | | | | | |
| | | | | | | | | | |
| PIM Interface Registers | | | | | | | | | |
| BA+0x10 | RW | PIM Control Register | | | | | | | |
| | RW | PIM Address Register | | | | | | | |
| | RW | PIM Data Register | | | | | | | |
| | | | | | | | | | |
| Rectifier Control Registers | | | | | | | | | |
| BA+0x48 – 0x4B | RO | Voltage Measured | | | | | | | |
| (32-bit values in | RO | Current Measured | | | | | | | |
| 4 byte wide regs) | RO | Power Measured | | | | | | | |
| | | | | | | | | | |
| | RW | Over Voltage Warning Threshold | | | | | | | |
| | RW | Over Current Warning Threshold | | | | | | | |
| | RW | Over Voltage Error Threshold | | | | | | | |
| | RW | Over Voltage Error Threshold | | | | | | | |

Fig. 16

RECONFIGURABLE CONTROL ARCHITECTURES AND ALGORITHMS FOR ELECTRIC VEHICLE WIRELESS ENERGY TRANSFER SYSTEMS

CROSS-REFERENCE TO RELATED APPLICATIONS

This application is a continuation of and claims priority to U.S. application Ser. No. 13/612,494 filed Sep. 12, 2012, which claims the benefit of U.S. provisional patent application 61/532,281 filed Sep. 12, 2011 and U.S. provisional patent application 61/566,450 filed Dec. 2, 2011, whose disclosure contents are hereby incorporated by reference in their entirety.

BACKGROUND

Field

This disclosure relates to wireless energy transfer and methods for controlling the operation and performance of electric vehicle wireless power transmission systems.

Description of the Related Art

Energy or power may be transferred wirelessly using a variety of known radiative, or far-field, and non-radiative, or near-field, techniques as detailed, for example, in commonly owned U.S. patent application Ser. No. 12/613,686 published on May 6, 2010 as US 2010/010909445 and entitled "Wireless Energy Transfer Systems," U.S. patent application Ser. No. 12/860,375 published on Dec. 9, 2010 as 2010/0308939 and entitled "Integrated Resonator-Shield Structures," U.S. patent application Ser. No. 13/222,915 published on Mar. 15, 2012 as 2012/0062345 and entitled "Low Resistance Electrical Conductor," U.S. patent application Ser. No. 13/283,811 published on Oct. 4, 2012 as US 2012/024898 and entitled "Multi-Resonator Wireless Energy Transfer for Lighting," the contents of which are incorporated by reference.

Recharging the batteries in full electric vehicles currently requires a user to plug a charging cord into the vehicle. The many disadvantages of using a charging cord, including the inconvenience, weight, and awkwardness of the cord, the necessity of remembering to plug-in and un-plug the vehicle, and the potential for cords to be stolen, disconnected, damaged, etc., have motivated makers of electric vehicles to consider wireless recharging scenarios. Using a wireless power transmission system to recharge an electric vehicle has the advantage that no user intervention may be required to recharge the vehicle's batteries. Rather, a user may be able to position a vehicle near a source of wireless electricity and then an automatic control system may recognize that a vehicle in need of charge is present and may initiate, sustain, and control the delivery of wireless power as needed.

One of the advantages of wireless recharging of electric vehicles is that the vehicles may be recharged using a variety of wireless power techniques while conforming to a variety of performance criteria. The variety of available wireless power techniques and acceptable performance criteria may present challenges to system designers who may like to provide for interoperability between different wireless sources and wireless devices (usually integrated in the vehicles) and at the same time differentiate their products by offering certain enhanced features. Therefore there is a need for an electric vehicle wireless power system control architecture that may ensure safe, efficient and reliable performance that meets certain industry performance standards and that offers designers and users of the end-system the opportunity to customize their systems to offer differentiated and enhanced features to the drivers of their vehicles.

SUMMARY

This invention relates to a control architecture for electric vehicle (EV) wireless power transmission systems that may be segmented so that certain essential and/or standardized control circuits, programs, algorithms, and the like, are permanent to the system and so that other non-essential and/or augmentable control circuits, programs, algorithms, and the like, may be reconfigurable and/or customizable by a user of the system. In addition, the control architecture may be distributed to various components of the wireless power system so that a combination of local or low-level controls operating at relatively high-speed can protect critical functionality of the system while higher-level and relatively lower speed control loops can be used to control other local and system-wide functionality. This combination of distributed and segmented control may offer flexibility in the design and implementation of higher level functions for end-use applications without the risk of disrupting lower level power electronics control functions.

The inventors envision that the control architecture may comprise both essential and non-essential control functions and may be distributed across at least one wireless source and at least one wireless device. Non-essential control functions may be arranged in a hierarchy so that, for example, more sophisticated users may have access to more, or different reconfigurable control functions than less sophisticated users. In addition, the control architecture may be scalable so that single sources can interoperate with multiple devices, single devices can interoperate with multiple sources, and so that both sources and devices may communicate with additional processors that may or may not be directly integrated into the wireless power charging system, and so on. The control architecture may enable the wireless power systems to interact with larger networks such as the internet, the power grid, and a variety of other wireless and wired power systems.

An example that illustrates some of the advantages of the distributed and segmented architecture we propose is as follows. Imagine that an original equipment manufacturer (OEM) of an EV wireless power transmission system may need to provide a system with certain guaranteed and/or standardized performance such as certain end-to-end transmission efficiency, certain tolerance to system variations, certain guarantees for reliability and safety and the like. An integrator who integrates the wireless power transmission system into an electric vehicle may wish to distinguish their vehicle by guaranteeing higher efficiency and/or more robust safety features. If the control architecture is structured in such a way that the integrator can set certain thresholds in the control loops to ensure higher efficiency and/or may add additional hardware (peripherals) to the system to augment the existing safety features, then the integrator may be able to offer significant product differentiation while also guaranteeing that basic system requirements and/or standards are met. However, if the control architecture is not segmented to offer some reconfigurable functions while protecting the critical functions of the wireless power system, changing certain control loops and/or adding additional hardware may disrupt the required low-level power delivery, reliability, and safety performance of the system.

Note that the inventive control architecture described in this disclosure may be applied to wirelessly rechargeable electric vehicles using traditional inductive and magnetic resonance techniques. Because the performance of traditional inductive wireless power transmission systems is limited compared to the performance of magnetic resonance power transmission systems, the exemplary and non-limiting embodiments described in this disclosure will be for magnetic resonance systems. However, it should be understood that where reference is made to source and device resonators of magnetic resonance systems, those components may be replaced by primary coils and secondary coils in traditional inductive systems. It should also be understood that where an exemplary embodiment may refer to components such as amplifiers, rectifiers, power factor correctors and the like, it is to be understood that those are broad descriptions and that amplifiers may comprise additional circuitry for performing operations other than amplification. By way of example but not limitation, an amplifier may comprise current and/or voltage and/or impedance sensing circuits, pulse-width modulation circuits, tuning circuits, impedance matching circuits, temperature sensing circuits, input power and output power control circuits and the like.

In one aspect of the invention a wireless energy transfer system may include a segmented control architecture. The wireless system may include a primary controller and a user configurable secondary controller that is in communication with the primary controller. The primary controller may be configured to perform the essential control functions for the wireless system. The essential control functions of the primary controller may include maintaining the wireless energy transfer operating safety limits. The primary controller may monitor and control the voltage and currents on the components of the wireless energy transfer system. The user configurable secondary controller may be configured to allow adjustment of non-safety critical parameters of the system such as adjusting the maximum power output, scheduling of on and off times, adjusting the frequency of energy transfer, and the like. In accordance with exemplary and non-limiting embodiments the primary and secondary controllers may be implemented on separate hardware or processors. In other exemplary embodiments the primary and secondary controllers may be virtual controllers and implemented on the same hardware.

BRIEF DESCRIPTION OF FIGURES

FIG. 4 shows an exemplary charging cycle use-case.

FIG. 13 shows exemplary ASP control parameters.

FIG. 14 shows exemplary ADP control parameters.

FIG. 15 shows exemplary amplifier control parameters.

FIG. 16 shows exemplary rectifier control parameters.

DETAILED DESCRIPTION

This disclosure describes exemplary reconfigurable system control concepts for electric vehicle wireless power transmission systems. In general, an electric vehicle (EV) may be any type of vehicle such as a car, a boat, a plane, a bus, a scooter, a bike, a cart, a moving platform, and the like that comprises a rechargeable battery. The wireless power transmission system may provide power to the battery charging circuit of the electric vehicle and/or it may power the vehicle directly. Wireless power may be provided to the vehicle while it is stationary or while it is moving. The power provided wirelessly to recharge the vehicle battery may be more than 10 Watts (W), more than 100 W, more than a kilowatt (kW), more than 10 kW, and/or more than 100 kW, depending on the storage capacity and power requirements of the vehicle. In some exemplary low power embodiments, fewer control loops and/or less distributed and/or less segmented control architectures may be sufficient to ensure safe, reliable and efficient operation of the wireless power transmission system. In some exemplary high power embodiments, redundant control loops and/or multi-level control architectures may be required to realize safe, reliable and efficient operation of the wireless power transfer system.

This disclosure describes certain control tasks that may be necessary for enabling an electric vehicle charging engagement using a wireless energy transfer system as well as potential control loops, states, and sequences of interactions that may govern the performance of the system. The proposed control architectures and tasks may enable transaction management (e.g. billing, power origination identification, direction of power flow), integration with vehicle electronics, and higher level control tasks for system operation, communications, and anomaly resolution. Throughout this disclosure we may refer to certain parameters, signals, and elements as being variable, tunable, controllable, and the like, and we may refer to said parameters, signals and elements as being controlled. It should be understood that system parameters, signals and elements may be controlled using hardware control techniques, software control techniques, and/or a combinations of hardware and software control techniques, and that these techniques and the circuits and circuit elements used to implement them may be referred to as controllers and/or system controllers.

Figure 1:
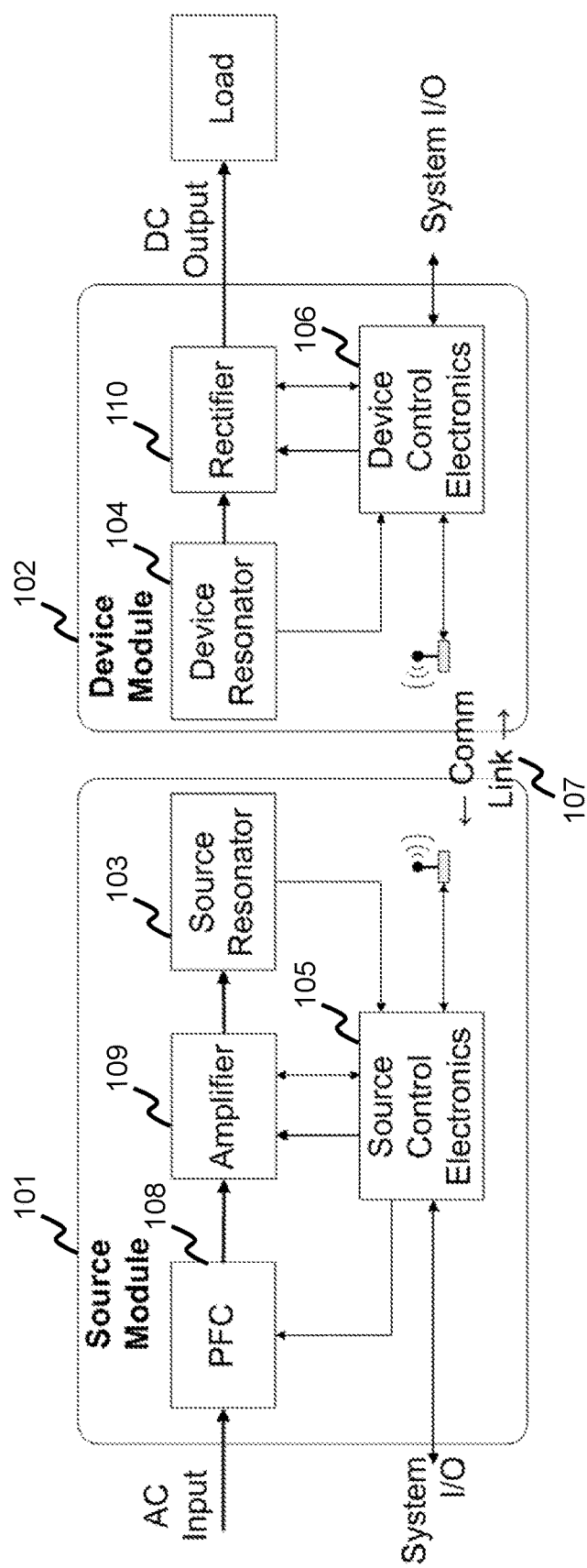
FIG. 1 shows exemplary components in an electric vehicle wireless power transfer system.

A block diagram of an exemplary wireless electric vehicle (EV) battery charging system is shown in FIG. 1. In this embodiment the system is partitioned into a source module 101 and a device module 102, with each module consisting of a resonator 103, 104 and module control electronics 105, 106. The source module 101 also consists of a power factor corrector (PFC) 108 and an amplifier 109. The device module 102 also consists of a rectifier 110. The source module 101 may be part of a charging station and the device module 102 may be mounted onto a vehicle. Power may be wirelessly transferred from the source 101 to the device 102 via the resonators 103, 104. Closed loop control of the transmitted power may be performed through a communications link 107 between the source 101 and the device 102. The communications link 107 can be an out-of-band communications link, an in-band communications link, or a combination of in-band and out-of-band signaling protocols between the source 101 and device 102. In some embodiments, some or all of the system control functions may be realized in a computer, processor, server, network node and the like, separated from the source 101 and device 102 modules. In some embodiments, the system controller may control more than one source, more than one device and/or more than one system.

A wireless power transmission system for electric vehicle charging can be designed so that it may support customization and modifications of the control architecture. Such customizations and modifications may be referred to as reconfigurations, and an architecture designed to support such reconfigurations may be referred to as reconfigurable. In some exemplary and non-limiting embodiments, the control architecture may be realized in physically separate components, such as multiple microprocessors and some functions, processes, controls, and the like may be reconfigurable by a user of the system, and some may not. In some exemplary and non-limiting embodiments, the reconfigurable portions of the control architecture may be implemented in certain chips, micro-processors, field programmable gate arrays (FPGAs), Peripheral Interface Controllers (PICs), Digital Signal Processors (DSPs), Application Specific Processors (ASPs), and the like. In an exemplary embodiment, some reconfigurable portions of the control architecture may reside in ASPs which may be 32-bit microcontrollers with C-language source code. In some exemplary and non-limiting embodiments, the control code may reside on a single processor and a user may have permission to access certain portions of the code. In exemplary and non-limiting embodiments, both hardware and software segmentation of the control functions of an EV wireless power transmission system are contemplated in this disclosure.

In an exemplary embodiment, the system architecture may support ASPs in the source 101 and device 102 modules and these processors may be referred to as Application Source Processors (ASP) and the Application Device Processors (ADP). This control architecture may enable different users and/or manufacturers of different vehicles and vehicle systems to be able to add to the source code or customize it for integration with their vehicles and/or in their intended applications. Throughout this disclosure we may use the terms processor, microprocessor, controller, and the like to refer to the ASPs described above and any suitable type of microprocessor, field programmable gate array (FPGA), Peripheral Interface Controller (PIC), Digital Signal Processor (DSP), and the like, that is known to one of skill in the art. In embodiments, the ASP and ADP may be used to present certain system parameters and control points to wireless power system designers and/or vehicle integrators and to restrict access to certain other system parameters and control points. For example, certain control features may be essential to ensure proper and/or safe operation of a wireless power transmission system, and such control features may be implemented in hardware only loops and/or in physically separated microcontrollers and/or in restricted portions of the ASPs so that they may not be customized and/or modified by certain users of the systems.

In exemplary and non-limiting embodiments, one, some or all of the control functions of the wireless power system may be based on hardware implementations and/or may be hard-coded into the system and/or may be soft-coded into the system but with restricted access so that only select and verified users may make changes to the various codes, programs, algorithms and the like, that control the system operation.

Note that whether or not the functionality associated with the ASPs in this exemplary embodiment are realized in physically separate hardware components or in isolated sections of code, the concept of partitioning the control plane into at least source-side and device-side functions and into at least high-level and low-level functions is what enables the reconfigurability of system operation while guaranteeing certain safety, reliability and efficiency targets are met. The distribution and segmentation of the control plane allows flexibility in the adaptation of the higher level functions for vehicle designer and/or end user applications without the risk of disrupting the operation of the low level power electronics control functions. In addition, the partitioning of the control plane allows for variable control loop speeds; fast and medium speeds for the low level critical hardware control functions of the power electronics as well as slower control loop speeds for the high level designer and/or end user control loops.

As time goes on, this partitioned control plan architecture may scale to adjust to and support more functionality and applications, at the same time it may be adapted to changing hardware requirements and standardized requirements for the safe and efficient delivery of power. For example, the fast and medium speed control loops may be adapted to support wireless power transmission at a range of operating frequencies and over a range of coupling coefficients, both of which may eventually be set by regulatory agencies. Also, users may access and customize the higher level control functions to implement functionality that may include, but may not be limited to:

Programming an EV wireless source to connect through a wired internet connection in the source, or through Wi-Fi or the cellular network to display certain source attributes such as what type of resonator it comprises, how much energy it can supply, what the price is for the energy it supplies (this price may change during the day, being less expensive at night when the peak demand for electricity is lower, or it may change seasonally, costing more when the temperature is hot and air conditioning requirements are stressing the electrical supply), where the energy it supplies originates from (renewables, coal plant, etc.), does this source require a reservation, if it requires a reservation, when are the free times that can be reserved, what type of FOD detectors does it deploy, what is the status of the source (has FOD been detected and needs to be cleaned off before charging can be initiated, or has FOD been detected and so the source can only supply a limited amount of power).

Programming an EV wireless power transfer system so that it may connect to a communication network and may contact the vehicle user to report the status of the charge cycle and to report when charging is complete or when charging has been interrupted or that the source and/or device are in an anomaly state.

Programming an EV wireless power transfer system so that power is transmitted from the device back to the grid and managing the transaction so that the vehicle user is paid for supplying that energy.

Programming a user interface in the vehicle so that information regarding the position of the vehicle resonator relative to the source resonator can be relayed to the driver of the vehicle. The relative position information may be used to give the vehicle driver an estimate of the wireless transfer efficiency with the vehicle in its current location and may offer the driver a chance to change the parking position to improve the wireless system performance. The user interface may include visible, audible, vibrational and the like feedback to help the driver reposition the vehicle.

Programming an EV wireless power transfer system so that it communicates with an automatic vehicle parking capability resident on the vehicle and parks the vehicle in a position that is optimized for wireless power transfer efficiency. Other commands that may be communicated from the EV wireless power transmission system to the vehicle may include commands to control the active suspension of the vehicle to raise or lower the vehicle relative to the source to optimize wireless power transfer.

Figure 2:
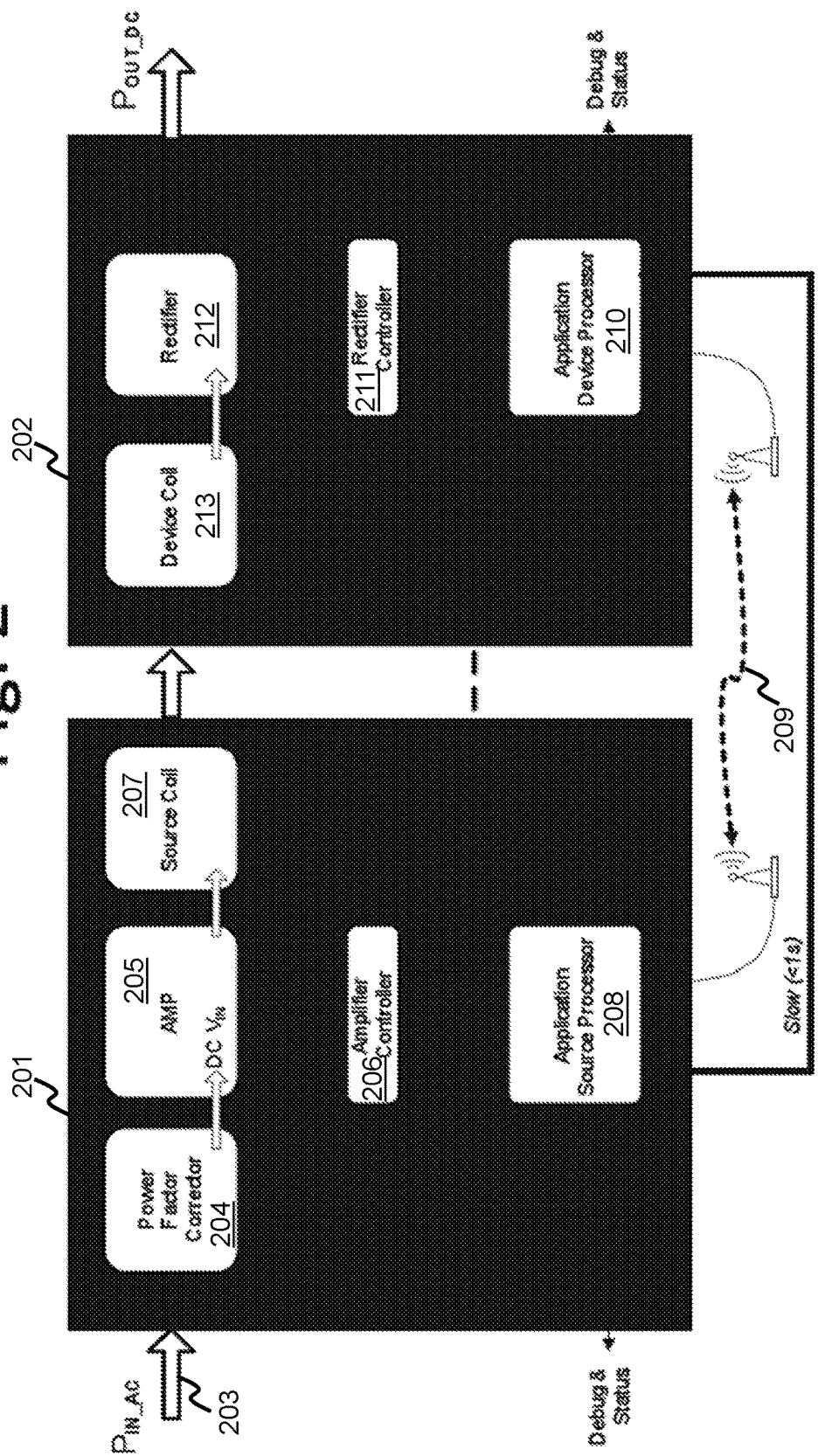
FIG. 2 shows an exemplary charging system control diagram for an electric vehicle wireless power transfer system. This exemplary embodiment shows that system performance may be monitored with a laptop through the wireless and/or wired "Debug" and "Status" ports.

FIG. 2 shows an exemplary charging system control diagram for an electric vehicle wireless power transfer system. In this block diagram, the source components 201 of the system are shown on the left side of the diagram and the device (or vehicle) components 202 of the system are shown on the right. The source components 201 include a power factor corrector 204, a switching amplifier 205, an amplifier controller 206, an ASP 208 and a source coil 207. The device components 202 include an ADP 210, a rectifier controller 211, a rectifier 212 and a device coil 213.

In embodiments, AC line power 203 may flow into a power factor corrector (PFC) 204 and provide a DC voltage to a switching amplifier 205. In embodiments, the DC voltage provided to the switching amplifier 205 may be variable and may be controlled. In exemplary and non-limiting embodiments, a DC voltage may be provided to the amplifier 205 from a DC source of power (not shown) such as a solar cell, a battery, a fuel cell, a power supply, a super capacitor, a fly wheel, and the like. In embodiments, the DC voltage from a DC power source may be variable and may be controlled.

The switching amplifier 205 in the source 201 of an electric vehicle wireless power transmission system may be any class of switching amplifier including, but not limited to, a class D amplifier, a class E amplifier and a class D/E amplifier. The switching frequency of the amplifier 205 may be any frequency and may preferably be a frequency previously identified as suitable for driving inductor coils and/or magnetic resonators. In embodiments, the switching frequency may be between 10 kHz and 50 MHz. In embodiments, the frequency may be approximately 20 kHz, or approximately 44 kHz, or approximately 85 kHz, or approximately 145 kHz, or approximately 250 kHz. In embodiments, the switching frequency may be between 400 and 600 kHz, between 1 and 3 MHz, between 6 and 7 MHz, and/or between 13 and 14 MHz. In embodiments, the frequency of the switching amplifier 205 may be tunable and may be controlled.

In embodiments, an amplifier controller 206 may manage the electronic components in the amplifier 205 and/or in the PFC 204 and/or in the DC power supply (not shown). The amplifier controller 206 may monitor and control so-called local control loops and local interlocks for conditions such as over voltage/current in the source electronics, ground-fault circuit interrupt in the source electronics, and out-of-specification AC impedance changes at the source coil 207. In embodiments, the amplifier controller 206 may react quickly to shut the system down safely in response to a variety of set point violations. The amplifier controller 206 may expose registers for set-points and control to the ASP through an inter-integrated circuit ($I^2C$) interface, referred to in the figure as the "User Interface". The amplifier controller 206 may also have a watchdog timer (or heartbeat input) to detect if communication with the Application Source Processor (ASP) 208 or with the vehicle has been lost.

In an exemplary embodiment, the ASP 208 may provide high-level control of the source electronics and the overall system charging cycle. For example, the ASP 208 may interface with a foreign-object-debris (FOD) detector that monitors the source module 201 for the presence of FOD and/or excessive temperature. The ASP 208 may be connected to an in-band and/or out-of-band communications link 209 that may communicate with the vehicle-side application device processor (ADP) 210 to provide closed loop control of the charging cycle.

In an exemplary embodiment on the vehicle side 202 (also called the device side), a rectifier controller 211 may perform low-level and local functions for the device side 202 that are analogous to those described for the source side 201. Again, an $I^2C$ interface may be provided for interfacing with a higher-level ADP. The ADP 210 could be configured to connect via a CAN-bus or equivalent to a battery manager that may control the power delivered from the rectifier 212 to the battery, vehicle engine or any time of power storage or management system on the vehicle. The ADP 210 could communicate that information to the source-side ASP 208 which, in turn, could adjust the power settings on the amplifier controller 206.

In an exemplary embodiment, the control architecture may be partitioned into three types of control loops: fast, medium and slow. The fast control loops may be for time critical functions (less than 1-ms latency) and may be either hardware control loops or interrupt-driven low-level software modules. Medium-speed control loops may be for functions that operate under real-time software control (<500-ms latency). Slow control loops (>500 ms latency) may be for functions with low bandwidth requirements or functions with unpredictable latency, for example, a 802.11-family wireless communication link.

FIG. 2 shows the three types of control loops as they may be applied to an exemplary electric vehicle wireless power transmission system. In embodiments, embedded software portions of the control loops may be partitioned between the amplifier and rectifier controllers 206, 211, respectively, and the processors (ASP 208 and ADP 210). The amplifier and rectifier controllers 206, 211, respectively, may handle the hardware control and the operation of high-power and/or sensitive electronics components. The ASPs may handle the system control loop and may provide interfaces to external peripherals, such as FOD detectors, communication links, monitoring equipment, and other vehicle and source electronics.

In exemplary and non-limiting embodiments, some of the functions that may operate under fast feedback-loop control may be based on hardware set-points and/or on software (programmable) set-points which may include but may not be limited to over-current protection, over-voltage protection, over-temperature protection, voltage and current regulation, transistor shoot-through current in the switching amplifier, GFCI (ground fault circuit interrupt) and critical system interlocks. In exemplary and non-limiting embodiments, system events that may cause damage to the system itself or to a user of the system in a short period of time may be detected and reacted to using fast feedback-loop control.

In exemplary and non-limiting embodiments, some of the functions that may operate under medium-speed feedback loops may include, but may not be limited to temperature set-point violations, impedance set points to declare an out-of-range condition for the source coil impedance, FOD detection, monitoring for violations of the minimum efficiency set point, local power control in the source-side electronics and processor heartbeat monitoring (i.e. watchdog-timer expiration). In exemplary and non-limiting embodiments, system events that may cause damage to the system itself or to a user of the system in a medium period of time and/or that may cause the system to operate in an undesirable state (e.g. low efficiency) may be detected and reacted to using medium feedback-loop control.

In exemplary and non-limiting embodiments, some of the functions that may operate under relatively slow-speed loop control may include but may not be limited to system power control loop (e.g. for executing a battery-charging profile), charge request/acknowledge messages between vehicle(s) and source(s), system start/stop messages, system level interlocks, RF communications link heartbeat monitoring (i.e. watchdog-timer expiration), status/GUI updates to a diagnostic laptop and messages for source/vehicle transactions, authentication and configuration. In exemplary and non-limiting embodiments, system events that may cause damage to the system itself or to a user of the system in a long period of time and/or that may cause the system to operate in an undesirable state (e.g. low efficiency, insufficient information for closing a transaction) may be detected and reacted to using slow feedback-loop control.

Figure 3:
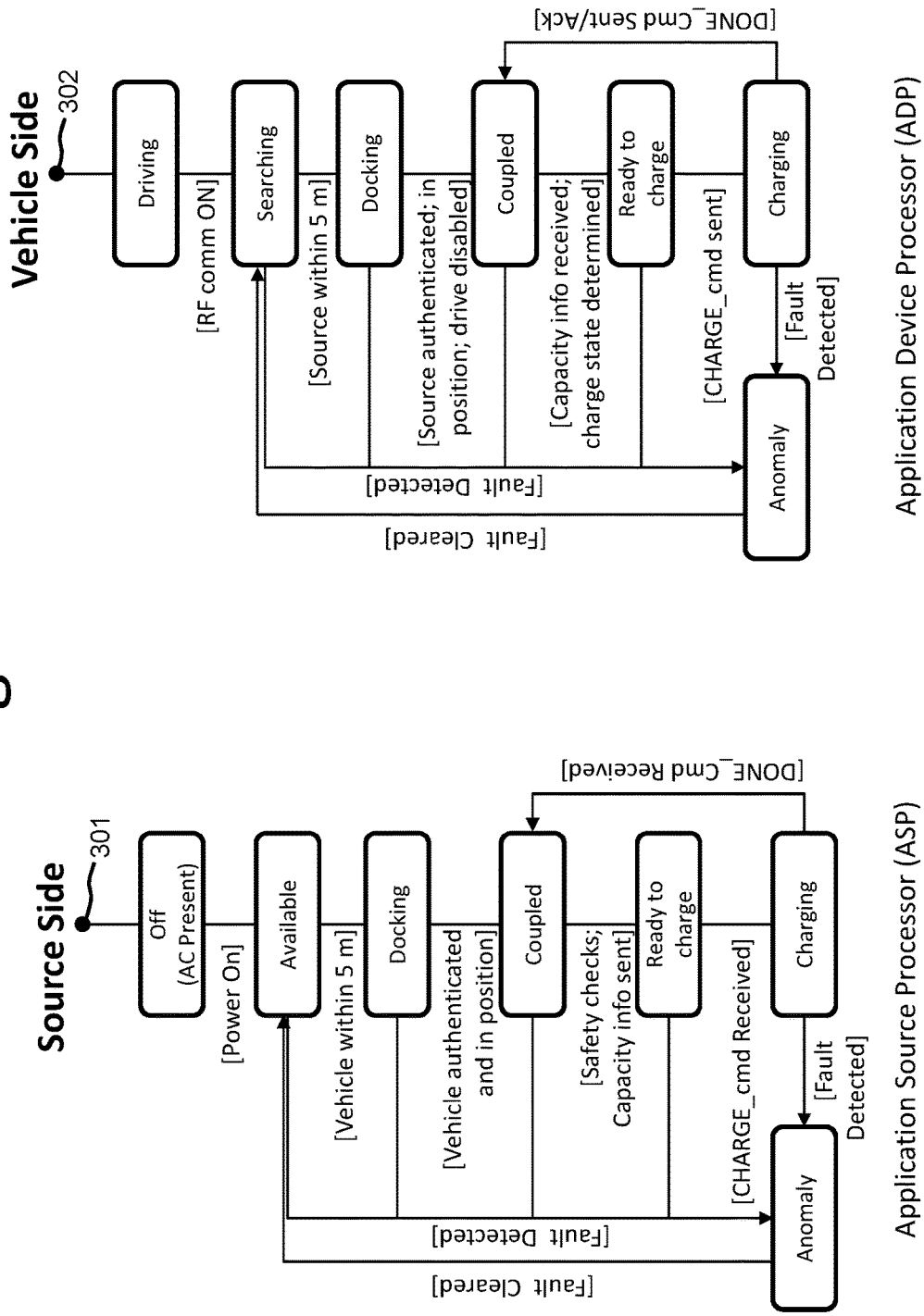
FIG. 3 shows a notional state diagram of the system charging cycle. Activation states are denoted by the rectangles. Conditional statements that enable transitions between states are enclosed in square brackets. Fault detection on either side results in both sides entering the Anomaly state.

FIG. 3 shows a notional state diagram of the system charging cycle. The diagram shows examples of state machines that may be running on the ASPs in the source side 301 and the vehicle side 302 of the EV wireless power transmission system. Potential activation states are shown within each rectangle and potential conditional statements that must be satisfied to enable transitions between states are enclosed in square brackets. In embodiments, in-band, out-of-band, and/or a combination of in-band and out-of-band wireless communication links between the source and the vehicle may provide for messaging and synchronization. In embodiments, the communications required to implement control functions, processes and the like may piggy-back on existing or native communication systems in and around the vehicle. For example, messages may be passed amongst the source(s), the vehicle(s), and any additional networked component(s) using CAN-bus equipment and protocols, Bluetooth equipment and protocols, Zigbee equipment and protocols, 2.4 GHz radio equipment and protocols, 802.11 equipment and protocols, and/or any proprietary signaling scheme equipment and protocols implemented by the user.

For charging electric vehicles that may be described in the standards proposed by the Society of Automotive Engineers (SAE), the charging engagement between the source and vehicle for wireless charging may be similar to that described by SAE J1772 for wired charging, with additional steps added to support wireless charging.

An exemplary use-case for stationary EV charging involving the operation of the control system is shown in the table in FIG. 4. In an exemplary embodiment, a wireless source may be powered and available to supply power to a wireless device and may be referred to as being in the Available state. A wireless source may constantly, periodically, occasionally and/or in response to some trigger, broadcast information regarding any of its availability, position, location, power supply capabilities, power costs, power origination (solar, coal burning plant, renewable, fossil fuel, etc.), resonator type, resonator cross-section (so that a vehicle may calculate and/or look-up an expected coupling coefficient with the source), and the like. A vehicle may be receiving information broadcast by wireless power sources and may search for an available wireless power source, with matching hard-wired and/or use selectable features, over which it may park. The vehicle's communication link may be active so that it is in the Searching state. If vehicle identifies a suitable wireless source, it may approach that source and initiate two way communications with the source so that the source and device side control electronics can exchange configuration information. In an exemplary embodiment, when sufficient information has been exchanged by the source and the device, and when the vehicle resonator has been positioned substantially in the near vicinity of the source resonator, the source and vehicle sides may switch to their Docking states.

In an exemplary Docking state, both source and device may confirm their compatibility and an alignment error signal may be provided to the vehicle driver so that he/she can maneuver the car into proper position. Once in position, the drive train of the vehicle may be disabled and the source and device may enter the Coupled state.

In an exemplary embodiment, a 'Charge Request' may be sent from the vehicle—either automatically or driver initiated, and may be received by the source. In the Coupled state, there may be further exchange of configuration information, safety checks, and the like. Once those are passed, both sides may enter the Ready to Charge state.

In an exemplary embodiment, in the Ready to Charge state, the vehicle may issue a 'Start Charging' command and both the source and the vehicle may enter the Charging state as the source power ramps up. In the Charging state, both source and vehicle may perform monitoring and logging of data, faults, and other diagnostics. Logging and monitoring may include, but may not be limited to an event loop that looks for hazardous and/or restricted Foreign Object Debris (FOD), overloads, unexpected temperature and/or efficiency excursions, and other asynchronous events.

In exemplary and non-limiting embodiments, hazard and/or restricted object detection that occurs in the source during any of the powered states may cause the source to switch into its Anomaly state. If wireless communication is still working, the vehicle may be notified and may also drop into its Anomaly state. If wireless communication is down, the vehicle may enter its Anomaly state because it didn't ask for the wireless power to be shut down and because the wireless communications watchdog timer expires.

In an exemplary embodiment, where the vehicle has entered the Anomaly state, state, the vehicle may send a message to the source that results in the source entering its Anomaly state.

In an exemplary embodiment, where the source has entered the Anomaly state, the source may send a message to the vehicle that results in the vehicle entering its Anomaly state.

In an exemplary embodiment, the source and/or vehicle may automatically begin a process for handling or disposition of the anomaly. The process may involve the source and vehicle exchanging health and status information to help discover the cause of the anomaly. Once the cause is determined, the source and vehicle may select a pre-planned action that corresponds to the cause. For example, in the event that detection of foreign object debris caused the anomaly, the source may reduce the power transfer level to a safe level where the foreign object debris does not overheat. In another example, in the event that the loss of RF communication was the cause, the source may stop power transfer until RF communication is re-established. In exemplary and non-limiting embodiments, where one or both sides of the system may have entered the anomaly state, the system may automatically communicate to a user that the system is in its Anomaly state. Communication may occur over the internet, over a wireless network, or over another communications link.

In an exemplary embodiment, under normal operating conditions, charging may end when the vehicle sends a stop-charging (DONE) command to the source. The source may immediately de-energize.

In this exemplary embodiment, after de-energizing, the source may return to the coupled state and may notify the vehicle of its state change. The vehicle may switch to the Coupled state and may receive additional information about the charge engagement from the source. At this point, the vehicle may either stay put or it may depart. Once the source senses that a vehicle has departed, it may return to the Available state.

Not explicitly shown the figures are exemplary control loops that may perform system safety and hazard monitoring, as well as localized FOD detection, for example. There a many ways a FOD detector might be used including; prior to a source declaring itself Available, it may run through a series of diagnostic tests including FOD detection, in the Docking and in the Coupled states, the FOD detector could check for potentially hazardous debris falling off of a vehicle and onto a source resonator, and before entering the Ready to Charge state, a FOD detector reading may be part of a final safety check. In exemplary and non-limiting embodiments, monitoring for FOD may occur during the Charging state. In exemplary and non-limiting embodiments, one, some or any anomalies or failed safety checks may turn down or shut down the amplifier and put both sides (source and vehicle) into their Anomaly states, where additional diagnostics can be safely performed.

Figure 5:
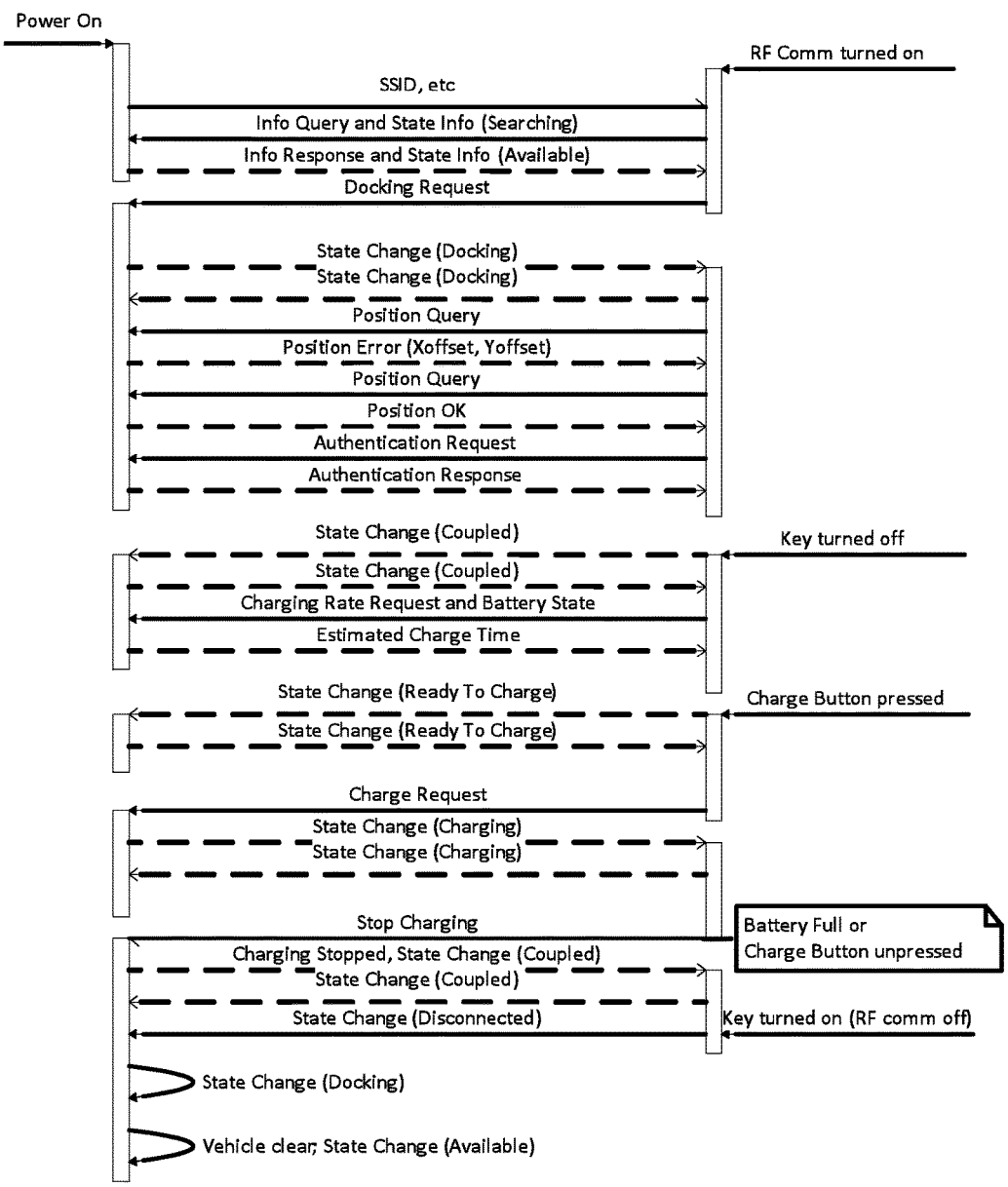
FIG. 5 shows a Sequence Diagram for interaction between a source and an electric vehicle during an exemplary charging engagement.

FIG. 5 shows another representation of some potential steps if a sequence of interactions in an exemplary embodiment of an EV wireless power transfer system. The diagram shows exemplary steps from the charging sequence described above following Unified Modeling Language (UML) conventions:

Time flows in the downward direction
The vertical bars under each side represent activation of different states
Arrows with solid lines indicate requests
Arrows with dashed lines indicate responses
Full arrow heads represent synchronous messages
Half arrow heads represent asynchronous messages
Arrows entering the diagram from off the page represent user actions Note that the diagram is not intended to show every message in the exemplary engagement just some examples helpful to understanding the interaction.

In exemplary embodiments of electric vehicle wireless power systems, a variety of control loops may be implemented to govern the operation of the wireless charging and/or powering of the electric vehicle. Some exemplary control loops for the exemplary system shown in FIG. 2 are described below. The control loops described below may be sufficient for some systems or they may need to be modified or added to ensure proper operation of other systems. The description of control loops should not be interpreted as complete, but rather illustrative, to describe some of the issues considered when deciding whether system control loops might be fast, medium or slow in their response time, and whether or not they should be user reconfigurable.

Figure 6:
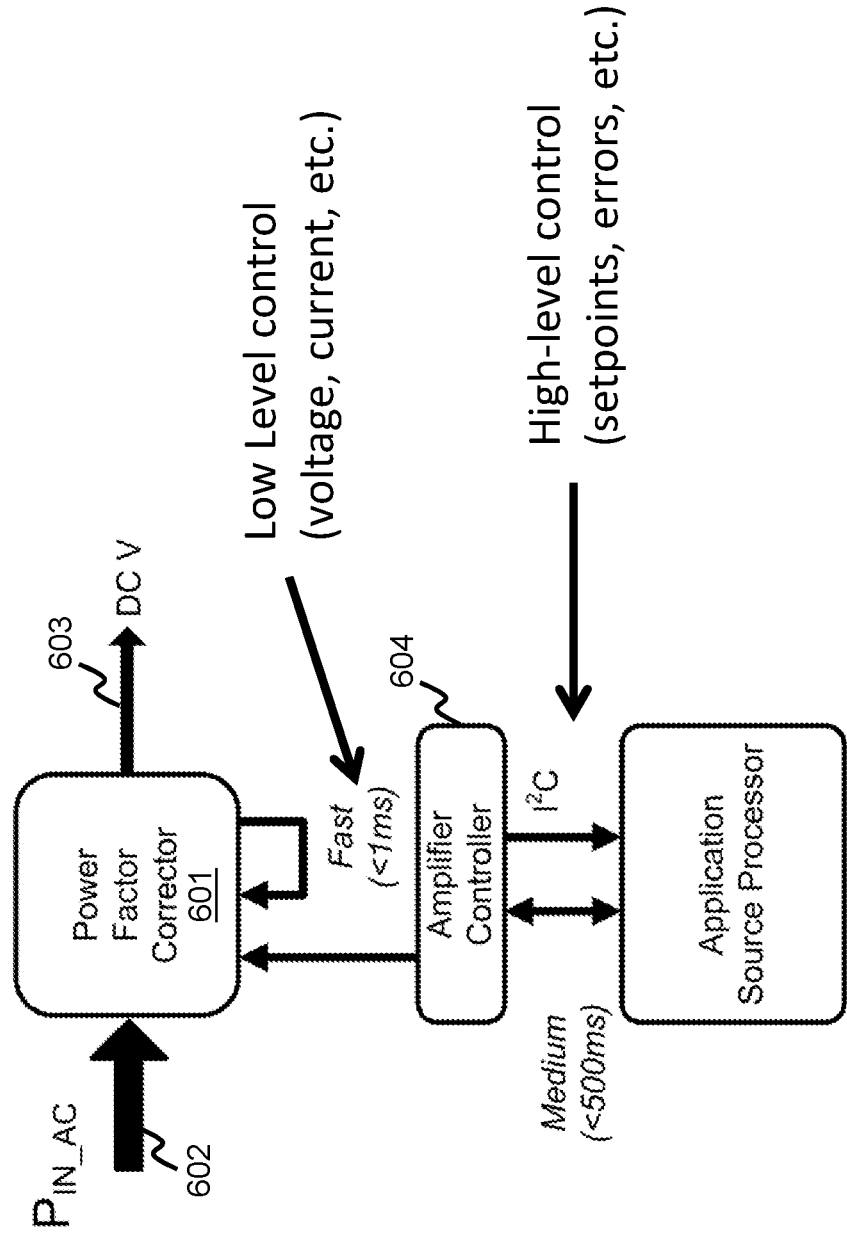
FIG. 6 shows an exemplary embodiment of power factor corrector control loops.

Referring to FIG. 6, in an exemplary EV wireless power transfer system, a power factor corrector 601 may convert an AC line voltage 602 to a DC voltage 603 for the source. It may provide active power factor correction to the line side and may provide a fixed or variable DC voltage to the source amplifier. Control of a power factor corrector 601 may be performed through a combination of hardware circuits and firmware in the amplifier controller 604. For example hardware circuits may be used to control against transient or short-duration anomalies, e.g. exceeding hard set-point limits such as local currents or voltages exceeding safety limits for circuit components, such as power MOSFETs, IGBTs, BJTs, diodes, capacitors, inductors, and resistors, and firmware in the amplifier controller 604 may be used to control against longer duration and slower developing anomalies, e.g. temperature warning limits, loss of synchronization of switching circuitry with the line voltage, and other system parameters that may affect power factor controller operation.

Figure 7:
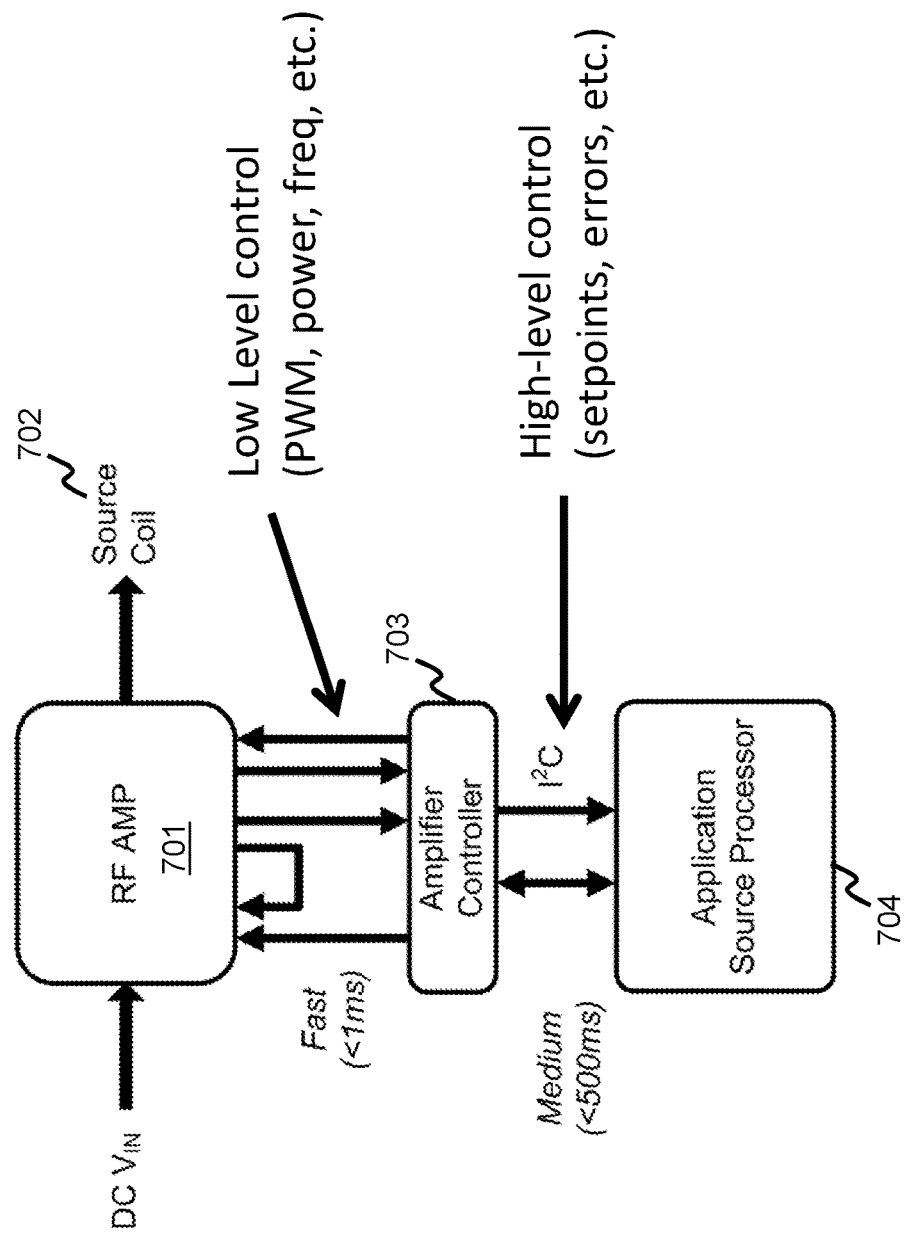
FIG. 7 shows an exemplary embodiment of source amplifier control loops.

Referring to FIG. 7, in an exemplary embodiment, an amplifier 701 may provide the oscillating electrical drive to the wireless power system source resonator coil 702. Hardware circuits may provide high-speed fault monitoring and processing. For example, violations of current and voltage set points and amplifier half-bridge (H-bridge) shoot-through may need to be detected within less than one millisecond in order to prevent catastrophic failures of the source electronics.

On a medium timescale, the amplifier controller 703 (and 604 in FIG. 6) may monitor the impedance of the source coil 702 and may react to out-of-range impedance conditions in less than 500 ms. For example, if the impedance is too inductive and out-of-range, the efficiency of power transfer may be reduced and the system may turn down or shut down to prevent components from heating up and/or to prevent inefficient energy transfer. If the impedance is inductive, but low and out of range, the system may react as when the resonator is too inductive, or it may react differently, or more quickly, since transitioning from an inductive load to a capacitive load may damage the source electronics. In embodiments, a hardware circuit may be used to sense if the load the amplifier is driving has become capacitive and may over-ride other slowed control loops and turn down or shut down the source to prevent the unit from becoming damaged.

In embodiments, system-level power requirements may be determined on the vehicle side and may be fed back from the ADP (not shown) to the ASP 704. Over I2C, the ASP 704 may request that the amplifier controller 703 increment or decrement the power from the amplifier 701 for example. The bandwidth of the power control loop may be limited by the latency in the wireless link and by the latency in communication between the ADP and the battery manager.

Figure 8:
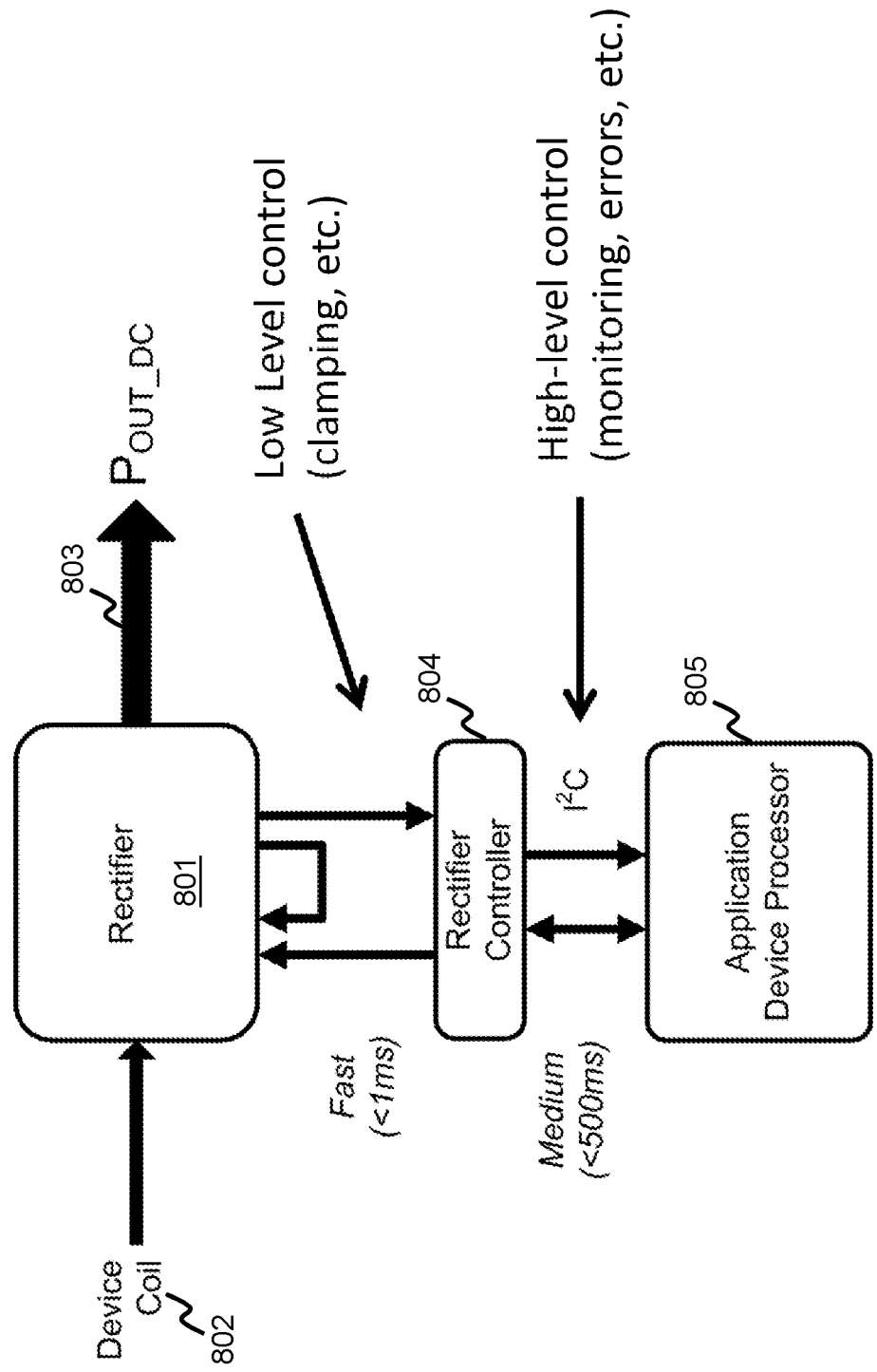
FIG. 8 shows an exemplary embodiment of device rectifier control loops.

Referring to FIG. 8, in some embodiments, a rectifier 801 may convert the AC power received from the device resonator coil 802 to DC output power 803 for the vehicle, vehicle battery or battery charger. A monitoring circuit for the rectifier output power, current and or voltage, as well as for the battery charge state may provide the feedback for closed-loop control of the system's power transfer. The rectifier 801, controlled by a rectifier controller 804, may control the output voltage to maintain it within the range desired by the battery management system. Additional fault monitoring and an interface to vehicle charging control processes may be provided by the ADP 805.

In an exemplary embodiment, a rectifier module 801 may comprise a full-bridge diode rectifier, a solid-state switch (e.g. double pole, single throw (DPST) switch), and a clamp circuit for over-voltage protection. Under normal operation, the full-bridge rectifier may send DC power through the closed switch and the inactive clamp circuit to the battery system. If the battery system needs more current, it may request it from the ADP which may forward the request to the ASP on the source side. If the battery needs less current, the corresponding request may be made. The speed with which these conditions must be detected, communicated, and acted upon may be determined by how long the system can safely operate in a non-ideal mode. For example, it may be fine for the system to operate in a mode where the wireless power system is providing too little power to the vehicle battery, but it may be potentially hazardous to supply too much power. The excess power supplied by the wireless source may heat components in the resonator, clamp circuit and/or battery charge circuit. The speed of the feedback control loop may need to be fast enough to prevent damage to these components but may not need to be faster than that if a faster control loop is more expensive, more complex, and/or less desirable for any reason.

In exemplary and non-limiting embodiments, a switch and a clamp may provide vehicle-side protection against potential failure modes. For example, if the vehicle side enters its Anomaly state, it may notify the source which may subsequently enter its Anomaly state and may turn down or shut down the source power. In case the wireless link is down or the source is unresponsive, the switch in the rectifier may open to protect the battery system.

In an exemplary embodiment, an ADP could enter its Anomaly state in several ways. A few examples include:
- The battery manager requests an emergency disconnect
- The voltage clamp circuit is active for more than 3 seconds (or some set period of time, potentially user settable and reconfigurable)
- The wireless communications link is down
- The ADP does not update the watchdog timer in the rectifier controller
- A temperature, voltage, current, or other error-condition set point is violated.

In an exemplary and non-limiting embodiment of a charging engagement, control-system information may flow across the following interfaces:
- ASP-ADP: Wireless interface between the Application Source Processor on the source side and the Application Device Processor on the vehicle side.
- ASP-Laptop: Wireless interface used to send a webpage with source diagnostic information that can be displayed on a laptop for demonstration, system configuration, and debug purposes.
- ADP-Laptop: Wireless interface used to serve a webpage with device diagnostic information that can be displayed on a laptop for demonstration and debug purposes.
- ASP-AmpCon: an I2C interface between the ASP and the amplifier controller.
- ADP-RectCon: an I2C interface between the ADP and the rectifier controller.

In exemplary and non-limiting embodiments, the first interface (ASP-ADP) may be used to exchange the messages needed to support the exemplary Sequence Diagram shown in FIG. 5. It may be that standardization activities will specify certain wireless communications protocols, such as the IEEE 802.11p protocol and/or Dedicated Short Range Communications (DSRC) using a licensed band at 5.9 GHz.

In exemplary and non-limiting embodiments that comply with standards, it may be that only certain wireless communications protocols will be supported by and used to implement the wireless power system controls. In exemplary and non-limiting embodiments not governed by standards, both known and proprietary wireless communications protocols may be supported by and used to implement wireless power system controls. In an exemplary embodiment, a reconfigurable EV wireless power transfer system has been demonstrated using the IEEE 802.11b unlicensed band (Wi-Fi) to implement the system control commands and communication.

In exemplary and non-limiting embodiments, the second and third diagnostic interfaces may be for running demonstration purposes and to provide diagnostic information in an easily accessible format. The connections with the laptop may also use 802.11b. A Wi-Fi enabled router may be required for simultaneous support of wireless connections for the ASP-ADP, ASP-Laptop, and ADP-Laptop. For demonstrations that only require the ASP-ADP connection, an 802.11b peer-to-peer connection could be used.

In exemplary and non-limiting embodiments, the fourth and fifth interfaces may be between the ASPs, other system controllers, and data loggers. Other system controllers may be implemented in physically distinct microcontrollers as described in the exemplary embodiment, or they may be co-located in the same ASPs.

Some example interactions amongst the ASP, ADP, controllers and FOD detectors are described below. These are just some of the example interactions, but in no way are the interactions contemplated by this invention limited to only the examples given below.

Figure 9:
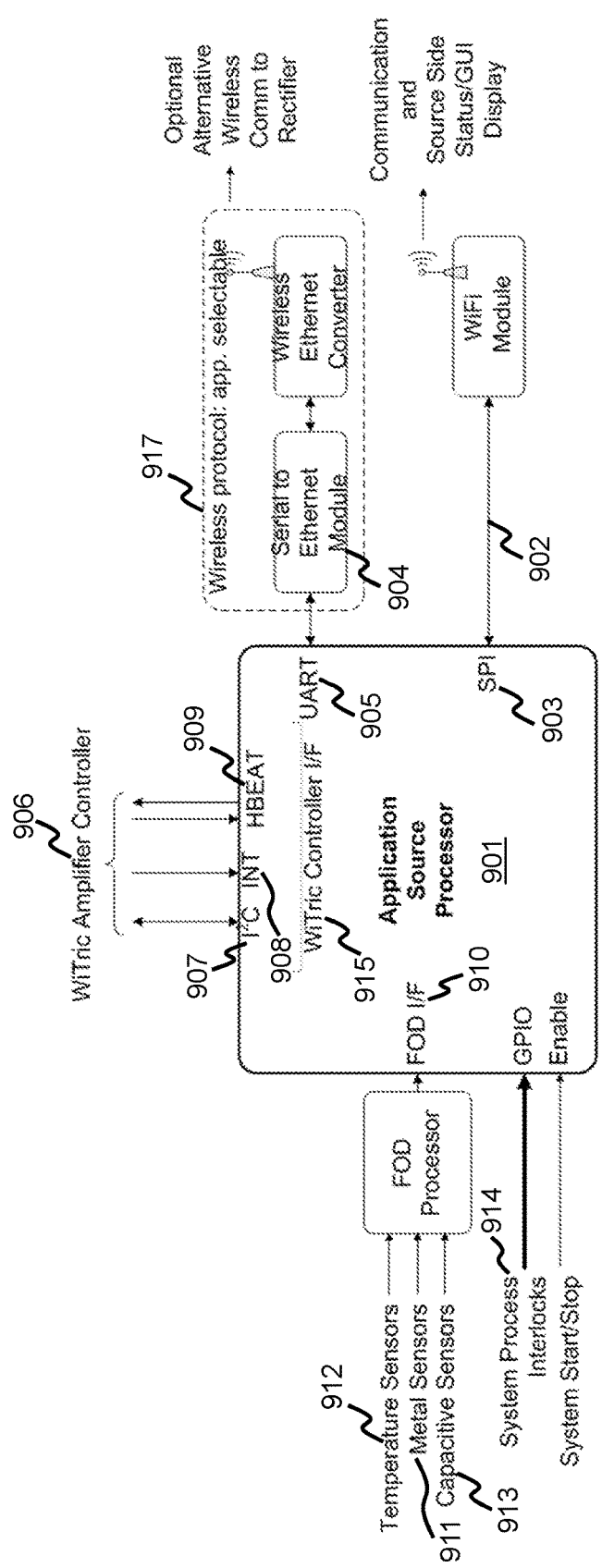
FIG. 9 shows exemplary interfaces to and from an application source processor.

In an exemplary embodiment, an Application Source Processor (ASP) may be a microprocessor that holds the state information for the source side of the reconfigurable EV wireless power transfer system. Physically, it may be implemented in a PIC-32 microcontroller. The software running on the ASP may execute the state transitions described previously, as well as the wireless communication with the vehicle side and potentially with the diagnostic laptop (if present). It is anticipated that users may modify or replace the software on the ASP and still operate the reconfigurable EV wireless power transfer system. FIG. 9 shows exemplary interfaces to and from an application source processor and FIG. 13 shows exemplary ASP control parameters. Referring to FIG. 9, Functional interfaces to the Application Source Processor 901 may include, but may not be limited to:
- Wi-Fi link 902 for communicating with the vehicle's ADP and for a diagnostic display for user demonstrations, diagnostics and/or customization (iPAD or laptop)
- Serial Peripheral Interface (SPI) 903 serial-link over Ethernet 904 on a 2.4 GHz RF link for communicating with the vehicle's ADP
- Hardware support for Universal Asynchronous Receiver/Transmitter (UART) 905 serial-link over Ethernet 904 on a 2.4 GHz RF link for an alternative method of communicating with the vehicle's ADP
- Interface 915 to amplifier controller 906
- I²C 907 for commanding and receiving status information
- Interrupt 908 for high-priority tasks (e.g. FOD detection, source or vehicle anomaly)
- Bi-directional watchdog/heartbeat signal 909
- FOD detection interface 910
- Metal object detector 911
- Temperature sensors 912
- Living being sensor, such as capacitive sensors 913

System process interlock 914 inputs-used for higher-level controllers that may need to shut down the source suddenly.

I²C interface to source side PIM (PCB Information Memory with a unique identifier (UID), configuration settings, etc.)

In an exemplary embodiment, an ASP 901 may have a Wireless Communications Link Interface. For example, the source-side ASP 901 may communicate with the vehicle-side ADP over a wireless communication link 902. The wireless protocol may be implemented using TCP/IP over a 2.4 GHz Wi-Fi link. The RF module may be IEEE Std. 802.11b compatible with a 4-wire SPI interface to the ASP.

In an alternate embodiment, a communication interface using the ASP 901 serial UART port 905 may be available as an option. The serial port might interface to an external wireless module to support the link. A standard UART interface 905 may provide the flexibility to use any particular wireless protocol 917 that a user may want.

In an exemplary embodiment, there may be an interface 915 between the ASP 901 and the amplifier controller 906. An amplifier controller 906 may provide low-level control of the source electronics, while the ASP 901 may provide high-level control and may be responsible for the execution of the overall system charging cycle. The interface 915 to the amplifier controller 906 may be presented as a set of control and status registers which may be accessible through an I²C serial bus 907. Such an arrangement could support user customization of the control algorithms.

In an exemplary embodiment, there may be an interface 910 between an ASP 901 and a FOD detection subsystem. The ASP 901 may be able to receive preprocessed digital data from a FOD processor 916. A FOD processor 916 may be designed to perform signal conditioning and threshold detection for the various types of sensors (e.g., 911, 912, 913) connected to it. Upon detection of FOD, the FOD processor 916 may interrupt the ASP 901 and transmit the FOD decision-circuit results. The ASP 901 may then take appropriate action (e.g. shut down the power, go to a low-power state, issue a warning, etc.) The FOD processor 916 may also transmit the pre-decision signal-conditioned data in digital form to the ASP 901 so that soft decision algorithms that use other information can be implemented in the ASP 901.

In an exemplary embodiment, there may be an interface between an ASP 901 and a System Interlock 914 subsystem. An interlock interface may consist of a set of optically coupled digital inputs which may act as system enables. The interlocks 914 may be externally generated signals which may be asserted to turn on the system. The interlocks 914 may also be able to be used by the user to shut down the system on command. The systems and signals that feed the external interlock signals (shutdown switch, additional FOD detection, infrastructure fault detection, etc.) may be application specific.

In an exemplary embodiment, there may be an interface between an ASP 901 and a Positioning and Alignment Interface. A positioning and alignment interface may communicate data from a vehicle alignment and positioning sensor to an ASP 901 to determine whether sufficient wireless power transfer efficiency may be achieved given the measured relative position of source and device resonators. If the resonators are not sufficiently well aligned, the ASP 901 may communicate to the device ADP and instruct the system to generate a message to the driver that the vehicle needs to be repositioned and to inhibit system turn-on until proper positioning is established.

In embodiments, there may be an interface between an ASP 901 and a Diagnostic/Debug subsystem. For the purposes of demonstrations, customization, and testing, a diagnostic/debug interface may be available across a wireless link between an ASP 901 and a laptop, or tablet, or smartphone or any other processing unit that preferably comprises a display. In some embodiments, the wireless communications connection may be through a dedicated Wi-Fi network. In embodiments, the interface may allow a laptop, or other external controller, to put the EV wireless power transmission system in a diagnostic and/or customization mode where preset interlocks may be over-ridden and state changes may be forced onto the ASP.

In embodiments, this interface may also allow a laptop, or other external controller, with a Wi-Fi capability to access the ASP 901. For example, the ASP 901 may be capable of streaming state information to the laptop which may store it in a log file. Parameters that can be stored in the log file may include:

Time-stamped events such as state changes, messages passed, messages received

Measured voltages, currents, temperatures, and impedances that are being compared to set points by the ASP or amplifier controller.

Configuration information such as software/firmware versions, hardware IDs, etc.

The log file should be able to be viewed on the laptop and incorporated into a spreadsheet for later analysis.

Figure 10:
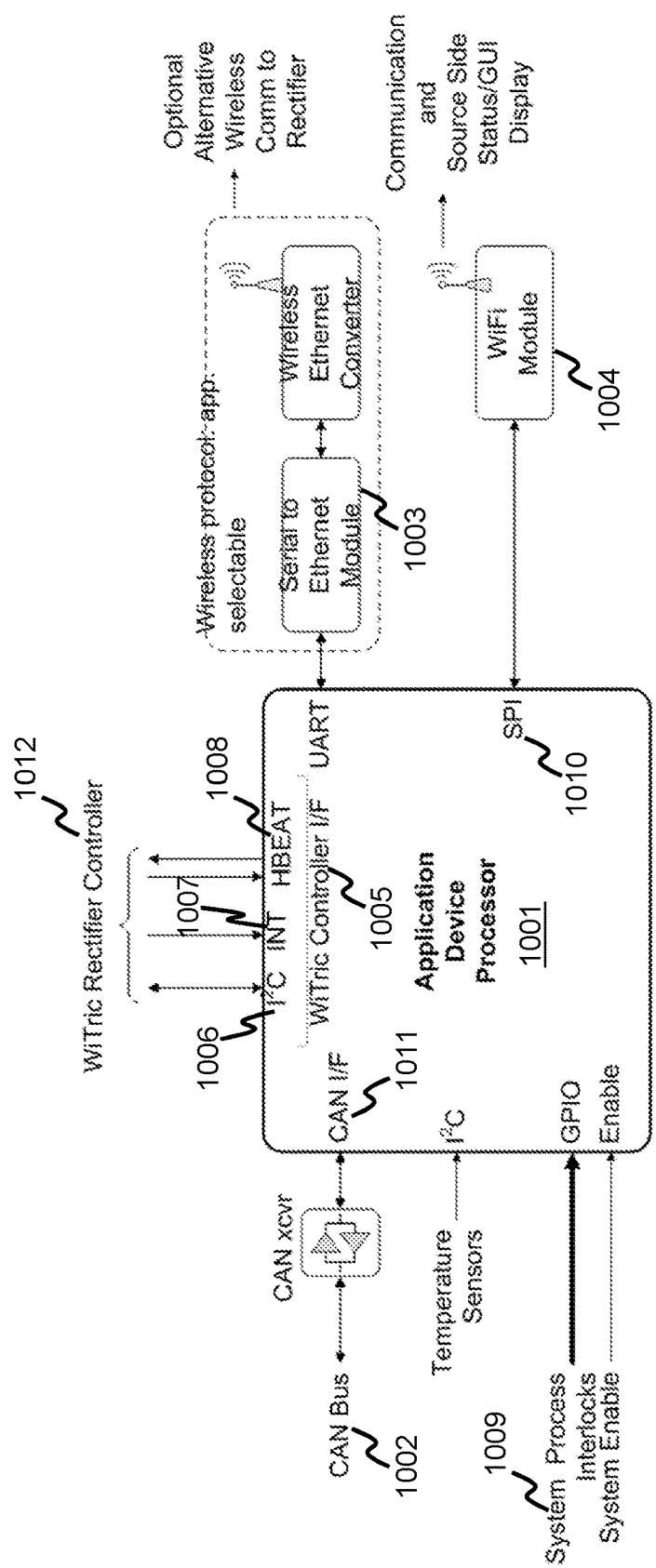
FIG. 10 shows exemplary interfaces to and from an application device processor.

FIG. 10 shows exemplary interfaces to and from an application device processor and FIG. 14 shows exemplary ADP control parameters. Referring to FIG. 10, in embodiments, an Application Device Processor (ADP) 1001 may be a microprocessor that holds the state information for the vehicle side of an EV wireless power transfer system. Physically, it may be implemented in a PIC-32 microcontroller. In embodiments, the software running on the ADP 1001 may execute the state transitions described previously, as well as the wireless communication with the source side and the diagnostic laptop, or other external controller. Users may modify or replace the software on the ADP 1001 to customize the operation and control of an EV wireless power transfer system.

In embodiments, functional interfaces to the Application Device Processor 1001 may include but may not be limited to:

Controller Area Network (CAN) Bus 1002 implemented on the physical layer (PHY) on the device side for use with vehicle communication, diagnostic equipment, and/or measurement and or monitoring equipment Serial-link over Ethernet 1003 on a 2.4 GHz RF link for communicating with the Source ASP Wi-Fi 1004 to a diagnostic display for user demonstrations and/or customizations (iPAD or laptop)

Interface to a rectifier controller 1005

I²C 1006 for commanding and receiving status information

Interrupt 1007 for high-priority tasks (e.g. FOD detection, vehicle anomaly)

Bi-directional watchdog/heartbeat signal 1008

System process interlock 1009 inputs used for higher-level controllers on a vehicle that may need to disable the charging cycle.

I²C interface to Device side PIM (PCB Information Memory with UID, configuration settings, etc.)

In some embodiments, there may be an interface 1011 between an ADP 1001 and a CAN Bus 1002. In some embodiments, the ADP 1001 may include a CAN bus interface 1011. In embodiments, software running on an ADP 1001 may be augmented by a user to support a CAN bus interface 1011 even if the as-designed and/or as-delivered EV wireless power transfer system did not include this functionality.

In embodiments, a vehicle-side Application Device Processor 1001 may have a Wireless Communications Link Interface. For example, a device-side ADP 1001 may communicate with the source-side ASP over a wireless communication link.

The wireless protocol may be implemented using TCP/IP over a 2.4 GHz Wi-Fi link 1004. The RF module may be IEEE Std. 802.11b compatible with a 4-wire SPI interface 1010 to the ADP.

In embodiments, there may be an interface 1005 between an ADP 1001 and a rectifier controller 1012. The ADP 1001 may communicate with the rectifier controller 1012 over an interface 1005 that may be similar to the one between the ASP and the amplifier controller. A rectifier controller 1012 may provide low-level control of the device electronics, while the ADP 1001 may provide high-level control and may be responsible for the execution of the overall system charging cycle. The interface 1005 to the rectifier controller 1012 may be presented as a set of control and status registers which may be accessible through an I²C serial bus 1006. Such an arrangement could support user customization of the control algorithms. The interface 1005 may also consist of, an Interrupt Request input 1007 and a set of uni-directional watchdog/heartbeat outputs 1008.

In an exemplary embodiment, there may be an interface between an ADP 1001 and a Positioning and Alignment Interface. A positioning and alignment interface may communicate data from a vehicle alignment and positioning sensor to an ADP to determine whether sufficient wireless power transfer efficiency may be achieved given the measured relative position of source and device resonators. If the resonators are not sufficiently well aligned, the ADP may communicate to the source ASP and instruct the system to generate a message to the driver that the vehicle needs to be repositioned and to inhibit system turn-on until proper positioning is established.

In embodiments, there may be an interface between an ADP 1001 and a System Interlock subsystem 1009. This interface may be analogous to that described between an ASP and a System Interlock subsystem. It could be used by the battery manager to force a shutdown of the EV wireless power transfer system. For example, if the interlock 1009 is de-asserted, the ADP 1001 may enter its Anomaly state and may demand that the source shut down immediately and may open the switch in the rectifier circuit. In the case of an unresponsive source or an interrupted wireless communications link, the ADP 1001 may open the switch within 3 seconds, or an appropriate period of time, and communicating a command that the source shut down.

In embodiments, there may be an interface between an ADP 1001 and a Diagnostic/Debug subsystem. For the purposes of demonstrations, customization, and testing, a diagnostic/debug interface may be available across a wireless link between an ADP and a laptop, or tablet, or smartphone or any other processing unit that preferably comprises a display. In some embodiments, the wireless communications connection may be through a dedicated Wi-Fi network. In embodiments, the interface may allow a laptop, or other external controller, to put the EV wireless power transmission system in a diagnostic and/or customization mode where preset interlocks may be over-ridden and state changes may be forced onto the ADP.

In embodiments, this interface may also allow a laptop, or other external controller, with a Wi-Fi capability to access the ADP. For example, the ADP may be capable of streaming state information to the laptop which may store it in a log file. Parameters that can be stored in the log file may include:
- Time-stamped events such as state changes, messages passed, messages received
- Measured voltages, currents, temperatures, and impedances that are being compared to set points by the ADP or rectifier controller.
- Configuration information such as software/firmware versions, hardware IDs, etc.
- The log file could be viewed on the laptop and dumped into excel for later analysis.

Figure 11:
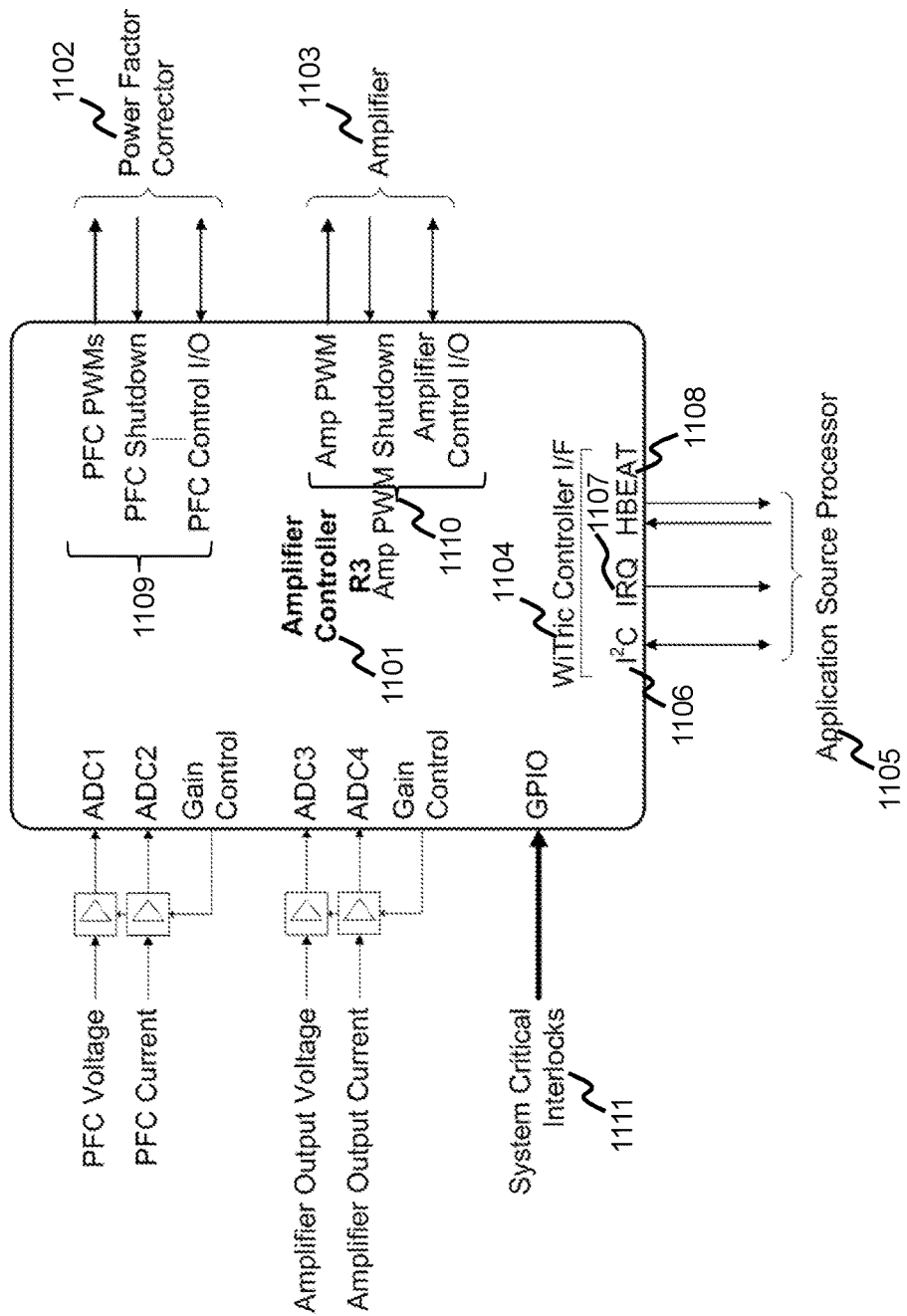
FIG. 11 shows exemplary interfaces to and from an amplifier controller.
Figure 12:
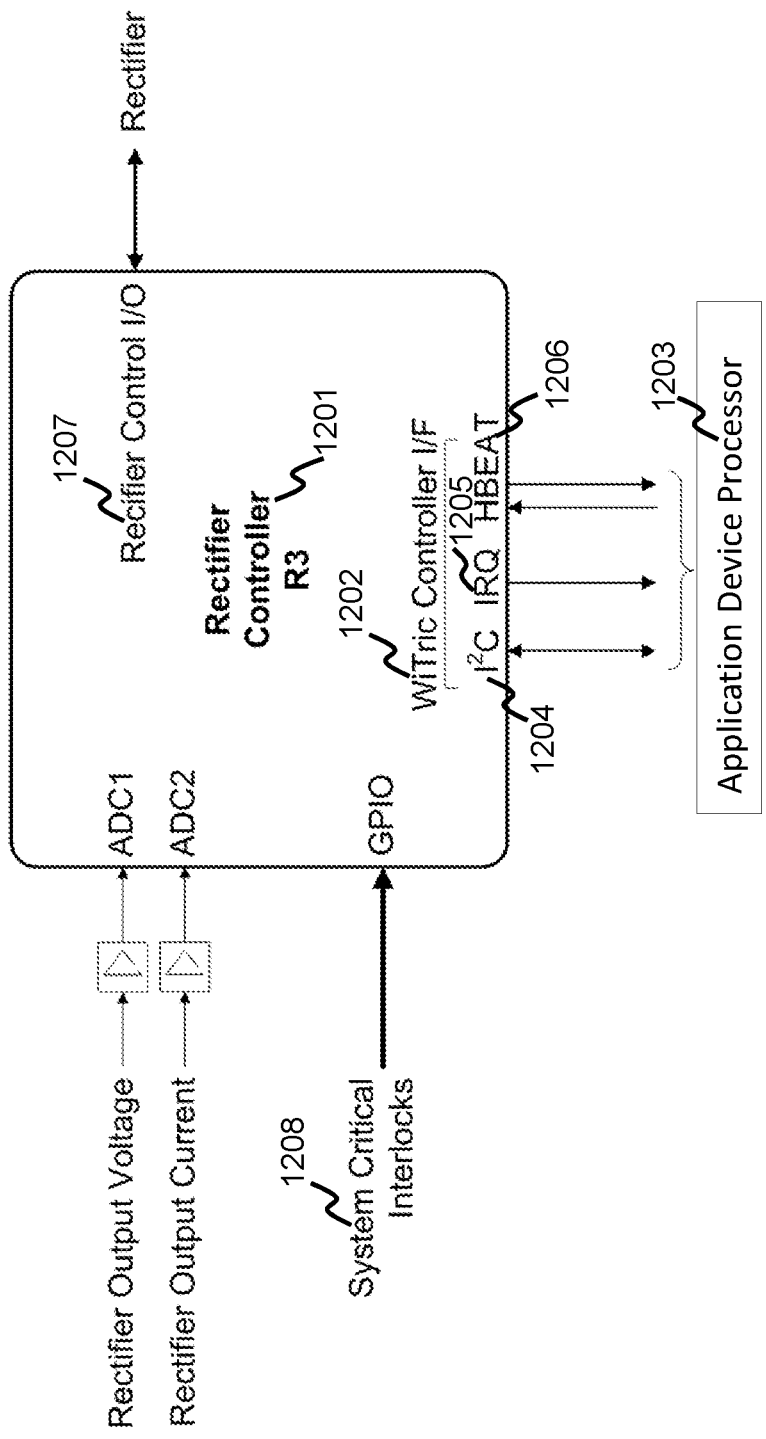
FIG. 12 shows exemplary interfaces to and from a rectifier controller.

FIG. 11 shows exemplary interfaces to and from an amplifier controller and FIG. 15 shows exemplary amplifier control parameters. Referring to FIG. 11, in embodiments of EV wireless power transfer systems, an amplifier controller 1101 may provide low-level control to a Power Factor Corrector (PFC) 1102 and a switching amplifier 1103. The interfaces between an amplifier controller 1101 and other system components may include, but may not be limited to:
- Interface 1104 to Application Source Processor 1105
  - I²C 1106
  - Interrupt 1107
  - Bi-directional Heartbeat/Watchdog 1108
- PFC Hardware control interface 1109
- Amplifier hardware control interface 1110
- System critical interlock inputs 1111
- System On/Off FIG. 12 shows exemplary interfaces to and from a rectifier controller and FIG. 16 shows exemplary rectifier control parameters. Referring to FIG. 12, in embodiments of EV wireless power transfer systems, a rectifier controller 1201 may provide high speed monitoring of rectifier power and system critical fault control. The interfaces between a rectifier controller 1201 and other system components may include, but may not be limited to:
- I²C interface 1202 to Application Device Processor 1203
  - I2C 1204
  - Interrupt 1205
  - Bi-directional Heartbeat/Watchdog 1206
- Rectifier hardware control/status interface 1207
- Fault indicators such as over current, over voltage, over temperature, clamp circuit activated, etc.
- Device side system critical interlock inputs 1208.

An A reconfigurable EV wireless power transmission system may be partitioned into notional subsystems so that the interactions between subsystems may be studied and design decisions made be made as to which control functions and set-points may be customizable by a user while still ensuring safe, efficient and reliable performance of the system. One method to analyze the system performance impact of allowing customization and/or reconfigurability of the control architecture and/or algorithms and/or set-points is to perform a Failure Mode Effects Analysis (FMEA). A preliminary FMEA may comprise a prioritized listing of the known potential failure modes. FMEA may need to be an on-going activity as new system failure modes are identified.

In exemplary and non-limiting embodiments, an FMEA process that scores potential failure modes in a number of categories may be used to identify the severity of certain failure scenarios. Categories that may be used to identify customizable parameters may include, but may not be limited to
- Severity (1-10): If the failure mode occurs, how severe (SEV) is the impact to system functionality, performance, or safety? A score of 10 indicates a major hazard and a score of 1 indicates a minor loss of performance or functionality.

Likelihood (1-10): How likely is the failure to occur? A 10 indicates almost certain occurrence while a 1 indicates a very remote chance of occurrence (OCC).

Undetectability (1-10): How likely is it that the failure will be detected (DET) and reacted to by the system during operation? A 10 indicates that the control architecture is very unlikely to detect the failure while a 1 indicates almost certain detection.

In exemplary and non-limiting embodiments, the potential failure modes may be prioritized according to their Risk Priority Number (RPN)-which is merely the product of their three category scores.

While the invention has been described in connection with certain preferred exemplary and non-limiting embodiments, other exemplary and non-limiting embodiments will be understood by one of ordinary skill in the art and are intended to fall within the scope of this disclosure, which is to be interpreted in the broadest sense allowable by law. For example, designs, methods, configurations of components, etc. related to transmitting wireless power have been described above along with various specific applications and examples thereof. Those skilled in the art will appreciate where the designs, components, configurations or components described herein can be used in combination, or interchangeably, and that the above description does not limit such interchangeability or combination of components to only that which is described herein.

All documents referenced herein are hereby incorporated by reference.

What is claimed is:

1. A method of operating a wireless energy transfer system executed by a control processor of the wireless energy transfer system, the method comprising:
    identifying a priority rank for each of a plurality of system faults, each priority rank representing an execution priority for a corresponding one of the system faults;
    monitoring the system for activation of faults, wherein the monitoring comprises:
        repeatedly executing a first control loop associated with a first fault having a first priority rank indicative of a high priority fault, the first control loop having an associated first execution time period $T_1$; and
        repeatedly executing a second control loop associated with a second fault having a second priority rank indicative of a moderate priority fault, the second control loop having an associated second execution time period $T_2$; and
    transmitting a signal to a power source controller in response to detecting that one of the first and second faults is active,
    wherein $T_2$ is larger than $T_1$ so that during a monitoring time period, the first control loop is executed more frequently than the second control loop; and
    wherein the signal is transmitted at a speed corresponding to the priority rank of the active fault.

2. The method of claim 1, comprising transmitting the signal to the power source controller during or following execution of at least one of the first and second control loops.

3. The method of claim 1, wherein the signal comprises an interrupt signal that causes the power source controller to reduce power supplied to a resonator coil of the wireless energy transfer system.

4. The method of claim 1, further comprising:
    transmitting the signal at a third speed if the first fault is active; and
    transmitting the signal at a fourth speed if the second fault is active,
    wherein the fourth speed is less than the third speed.

5. The method of claim 1, wherein identifying the priority rank for each of the plurality of system faults comprises determining a risk priority number (RPN) for each of the system faults.

6. The method of claim 1, wherein the power source controller is an amplifier controller.

7. The method of claim 1, wherein the power source controller is a rectifier controller.

8. The method of claim 1, wherein the respective priority ranks are each based on a combination of a fault severity, a fault likelihood, and a fault detectability.

9. The method of claim 1, further comprising providing a periodic signal to the power source controller.

10. The method of claim 1, wherein one of the plurality of system faults is a detection signal from a foreign-object-debris (FOD) detector.

11. The method of claim 1, wherein one of the plurality of system faults is a source anomaly.

12. The method of claim 1, wherein one of the plurality of system faults is a vehicle anomaly.

13. The method of claim 1, wherein one of the plurality of system faults is an out-of-range impedance.

14. The method of claim 1, wherein the first fault comprises a member selected from the group consisting of an over-current fault, an over-voltage fault, an over-temperature fault, a transistor shoot-through current fault in an amplifier, a ground-fault circuit interrupt, and an open system interlock.

15. The method of claim 1, wherein the second fault comprises a member selected from the group consisting of a temperature set-point violation, an out-of-range impedance for a source resonator, a foreign-object-debris (FOD) detection signal, and a minimum efficiency set-point violation.

16. The method of claim 1, further comprising repeatedly executing a third control loop associated with a third fault having a third priority rank indicative of a low priority fault, the third control loop having an associated third execution time period $T_3$, wherein $T_3$ is larger than $T_2$.

17. The method of claim 16, wherein the third fault comprises a member selected from the group consisting of a system stop message, a radio-frequency communication signal, an authentication signal, a charging request, and a configuration signal.

18. A method of operating a wireless energy transfer system, comprising:
    executing first and second groups of control loops on a control processor, wherein the first group of control loops comprises one or more members each associated with a different one of a first group of system faults, and wherein the second group of control loops comprises one or more members each associated with a different one of a second group of system faults;
    determining whether any members of the first and second groups of system faults are active based on the execution of the first and second groups of control loops;
    transmitting a control signal to a power source controller when any one or more members of the first and second groups of system faults are active; and
    adjusting power supplied to a resonator of the system by the power source controller in response to the control signal, wherein each member of the first group of control loops is executed at a speed that is faster than a speed at which each member of the second group of control loops is executed; and wherein the control signal is transmitted at a first speed if a member of the first group of system faults is active, and at a second speed slower than the first speed if a member of the second group of system faults is active.

19. The method of claim 18, further comprising:

executing a third group of control loops on the control processor, wherein the third group of control loops comprises one or more members each associated with a different one of a third group of system faults;

determining whether any members of the third group of system faults are active based on the execution of the third group of control loops; and transmitting the control signal to the power source controller when any members of the third group of system faults are active, wherein each member of the third group of control loops is executed at a speed that is slower than a speed at which each member of the second group of control loops is executed; and wherein the control signal is transmitted at a third speed slower than the second speed if a member of the third group of system faults is active.

20. The method of claim 18, further comprising associating a priority rank with the control loops of the first and second groups, and executing the control loops of the first and second groups according to the priority ranks.

21. The method of claim 18, wherein the first group of system faults comprises an over-current fault, an over-voltage fault, an over-temperature fault, a transistor shoot-through current fault in an amplifier, a ground-fault circuit interrupt, and an open system interlock.

22. The method of claim 18, wherein the second group of system faults comprises a temperature set-point violation, an out-of-range impedance for a source resonator, a foreign object debris (FOD) detection signal, and a minimum efficiency set-point violation.

\* \* \* \* \*

UNITED STATES PATENT AND TRADEMARK OFFICE
CERTIFICATE OF CORRECTION

PATENT NO. : 10,424,976 B2
APPLICATION NO. : 15/355143
DATED : September 24, 2019
INVENTOR(S) : Simon Verghese et al.

Page 1 of 1

It is certified that error appears in the above-identified patent and that said Letters Patent is hereby corrected as shown below:

In the Specification

Column 1
Line 12, delete "61/532,281" and insert -- 61/533,281 --

Signed and Sealed this
Fourth Day of February, 2020

Andrei Iancu
*Director of the United States Patent and Trademark Office*